United States Patent
Singh et al.

(10) Patent No.: US 8,818,758 B1
(45) Date of Patent: Aug. 26, 2014

(54) METHODS AND APPARATUS TO TRACK, VISUALIZE AND UNDERSTAND ENERGY AND UTILITIES USAGE

(75) Inventors: Barun Singh, Cambridge, MA (US); Edward Connelly, Sharon, MA (US); DeWitt Jones, Jamaica Plain, MA (US)

(73) Assignee: Wegowise, Inc., Boston, MA (US)

( * ) Notice: Subject to any disclaimer, the term of this patent is extended or adjusted under 35 U.S.C. 154(b) by 400 days.

(21) Appl. No.: 13/037,903

(22) Filed: Mar. 1, 2011

Related U.S. Application Data

(60) Provisional application No. 61/309,089, filed on Mar. 1, 2010.

(51) Int. Cl.
*G06F 11/30* (2006.01)
*G21C 17/00* (2006.01)

(52) U.S. Cl.
USPC .......................................................... 702/182

(58) Field of Classification Search
CPC .................................................... G06F 11/3409
USPC ........................................ 702/182; 700/276
See application file for complete search history.

(56) References Cited

U.S. PATENT DOCUMENTS

| | | | | |
|---|---|---|---|---|
| 2006/0241905 A1* | 10/2006 | McCalla | ....................... | 702/182 |
| 2010/0274366 A1* | 10/2010 | Fata et al. | ......................... | 700/7 |
| 2011/0209042 A1* | 8/2011 | Porter | ........................... | 715/212 |

\* cited by examiner

*Primary Examiner* — John Breene
*Assistant Examiner* — Manuel Rivera Vargas
(74) *Attorney, Agent, or Firm* — Chapin IP Law, LLC

(57) ABSTRACT

Techniques disclosed herein include systems and methods for tracking, visualizing and understanding energy or utilities usage of one or many buildings. The system links building characteristics with energy or utilities use thereby enabling users to view energy or utilities usage and cost information at the portfolio, development, building, or meter levels. This technique allows for easy comparison among and between buildings in a portfolio, group, or common ownership. The system provides for quick creation of custom reports to compare buildings across portfolios. These custom reports further enable users to compare energy/utilities use of buildings within a given account relative to energy/utilities use of similar buildings in a larger database, thus providing meaningful performance benchmarking based on real data.

19 Claims, 12 Drawing Sheets

FIG. 2

| Utility Accounts & Apartments In This Building | | | | |
|---|---|---|---|---|
| Summary | Electricity | Natural Gas | Water | Apartments |

Specify the number of utility accounts in this building.
Include all accounts, regardless of whether or not you pay for them

- Electricity [1] Common-area electric accounts — You have defined 1 / 1 common-area accounts — complete
- [0] Apartment electric accounts — You have defined 0 / 0 apartment accounts — complete
- Natural gas [2] Gas accounts — You have defined 0 / 2 accounts — incomplete
- Natural gas is not metered at the apartment level
- Fuel Oil There are no oil accounts being tracked in this building
- Water [2] Water accounts — You have defined 0 / 2 accounts — incomplete
- Water is not metered at the apartment level (Continue) or (Cancel)

*FIG. 5*

Import Data For This Gas Account

Specify Template > Verify Data    Done!
Upload File

Use Existing Template

Create a New Template

Name for this Template    My Template

Spreadsheet    What row number does the data start on?  Row #3 ⬍
Formatting     How are the date fields formatted?       mm/dd/yy ⬍

Data Columns   Select the data fields included in this spreadsheet template from among the options below.

DATE FIELDS              USAGE FIELDS                COST FIELDS
End Date   Column B ⬍    Therms   Column A ⬍         Total Charge   Column C ⬍
Start Date               Btu                         Fuel Charge
Number of Days                                       Delivery Charge Preview   You can preview your template if you want, to make sure everything looks right.

( Create Template )

FIG. 7

Preview of your template

|   | A | B | C |
|---|---|---|---|
| 1 | Header information (no data in this row) | | |
| 2 | Header information (no data in this row) | | |
| 3 | Therms | End Date   (mm/dd/yy) | Total Charge |
| 4 | Therms | End Date   (mm/dd/yy) | Total Charge |
| 5 | Therms | End Date   (mm/dd/yy) | Total Charge |
| 6 | Therms | End Date   (mm/dd/yy) | Total Charge |
| 7 | Therms | End Date   (mm/dd/yy) | Total Charge |
| 8 | The spreadsheet can contain any number of rows of data. | | |

*FIG. 8*

METHODS AND APPARATUS TO TRACK, VISUALIZE AND UNDERSTAND ENERGY AND UTILITIES USAGE

CROSS REFERENCE TO RELATED APPLICATIONS

The present application claims the benefit of U.S. Provisional Patent Application No. 61/309,089, filed on Mar. 1, 2010, entitled "Methods And Apparatus To Track, Visualize And Understand Energy Usage," which is incorporated herein by reference in its entirety.

BACKGROUND

The present disclosure relates to usage and cost of various public utilities. Buildings, homes, structures, developments, etc., use various forms of energy and utilities. Such forms of energy and utilities are typically supplied as public utilities. Public utilities include any type of commodity or service generally available to the public, and usually associated with real property and related structures such as homes, apartments, office buildings, developments, etc. Public utilities can include, for example, electricity, water, natural gas, heating oil, telephone services, local solar energy, sewer services, etc. Note that while distribution or delivery of a given public utility may be privatized, the service or commodity is nevertheless a public utility in that the service or commodity is generally available or accessible to the public at large.

SUMMARY

Suppliers of public utilities generally maintain data relating to the cost and amount of public utilities purchased by various individuals or entities. This raw data has some value for indicating incremental costs, but by itself does not provide the information needed to help understand overall energy usage, relative cost, environmental impact, efficiency metrics, and savings from upgrades. Understanding such usage, impact, and savings information can be especially useful for owners and users of multiple buildings, developments, and multi-occupant structures. For example, a given property owner may have multiple buildings, in various geographic locations, with each various combinations of public utilities usage. More specifically, some buildings might be heated using natural gas through a forced hot air system, while other buildings may use a forced hot water system. Some buildings may be heated with natural gas, while others use electricity. Some buildings may be new construction, while others are relatively older. With such potential variations in public utilities usage and building characteristics, it becomes difficult to track and understand energy/utilities usage among the various buildings. Without knowing this information, it is difficult to know where energy/utilities savings can be realized, what buildings to focus on, and how improvements affect utilities usages.

Techniques disclosed herein include systems and methods for tracking, visualizing and understanding utilities usage of one or many buildings. The system links building characteristics with utilities consumption thereby enabling users to view utilities usage and cost information at the portfolio, development, building, apartment, or meter levels. This technique allows for easy comparison among and between buildings in a portfolio, group, or common ownership by aggregating data among buildings. Comparisons can be made at the portfolio level, or development level, or building level, or individual apartment unit level, etc. The system provides for quick creation of custom reports to compare buildings across portfolios. These custom reports further enable users to compare energy use of buildings within a given account relative to energy use of similar buildings in a larger database, thus providing meaningful performance benchmarking based on real data.

One embodiment includes a utilities manager process or system for tracking utilities usage. The utilities manager receives public utilities usage data that corresponds to at least one building. Such utilities usage data can include costs, payments, dates, and amounts of one or more utilities. The data can be received via manual input, in response to requesting data from websites of utilities suppliers, or another manual or automated process. The utilities manager also receives building characteristics data that indicates physical characteristics of the at least one building. For example, the data can include type of building, construction material, year built, number of levels, square footage, geographic location, etc. This building characteristics data may be received by manual input or from external electronic sources through an automated process. The utilities manager organizes the public utilities usage data and the building characteristics data. This organization includes linking the physical characteristics data to corresponding public utilities data. For example, buildings can be defined and stored within a database with physical characteristics data as well as utilities usage data linked to or referenced by the defined buildings. The utilities manager analyzes the utilities data and calculates utilities performance statistics of the at least one building. The utilities manager can then display utilities performance statistics of the at least one building.

In another embodiment, the utilities manager defines the buildings and public utilities accounts within a hierarchy, and propagates public utilities usage data within the hierarchy to corresponding defined buildings. In other words, the system can organize buildings by levels (tiers) of an organization, by geography, type, or other criteria. The utilities manager can identify a given public utility account that is shared by two or more buildings, and allocate public utilities usage data among the two or more buildings based on physical characteristics of the two or more buildings. The utilities manager can also display utilities performance statistics of the selected buildings relative to utilities usage of other buildings identified as having similar physical characteristics. Such a display can indicate how utilities usage/energy performance of a given building relates to similar buildings or to efficient buildings. This performance comparison can be used in conjunction with one or more calculated benchmarks. The utilities manager can also provide various custom reports at various levels within a hierarchy of buildings.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving public utilities usage data that corresponds to at least one building; receiving building characteristics data that indicates physical characteristics of the at least one building; organizing the public utilities usage data and the building characteristics data, including linking the physical characteristics data to corresponding public utilities data; calculating utilities performance statistics of the at least one building; and displaying utilities performance statistics of the at least one building. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by WegoWise, Inc., Boston, Mass., USA.

As discussed above, techniques herein are well suited for use in software applications supporting energy/utilities tracking applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 2 is an example screen shot of a utilities manager operating in a computer/network environment according to embodiments herein.

FIG. 5 is an example screen shot of a utilities manager operating in a computer/network environment according to embodiments herein.

FIG. 7 is an example screen shot of a utilities manager operating in a computer/network environment according to embodiments herein.

FIG. 8 is an example screen shot of a utilities manager operating in a computer/network environment according to embodiments herein.

DETAILED DESCRIPTION

Figure 1:
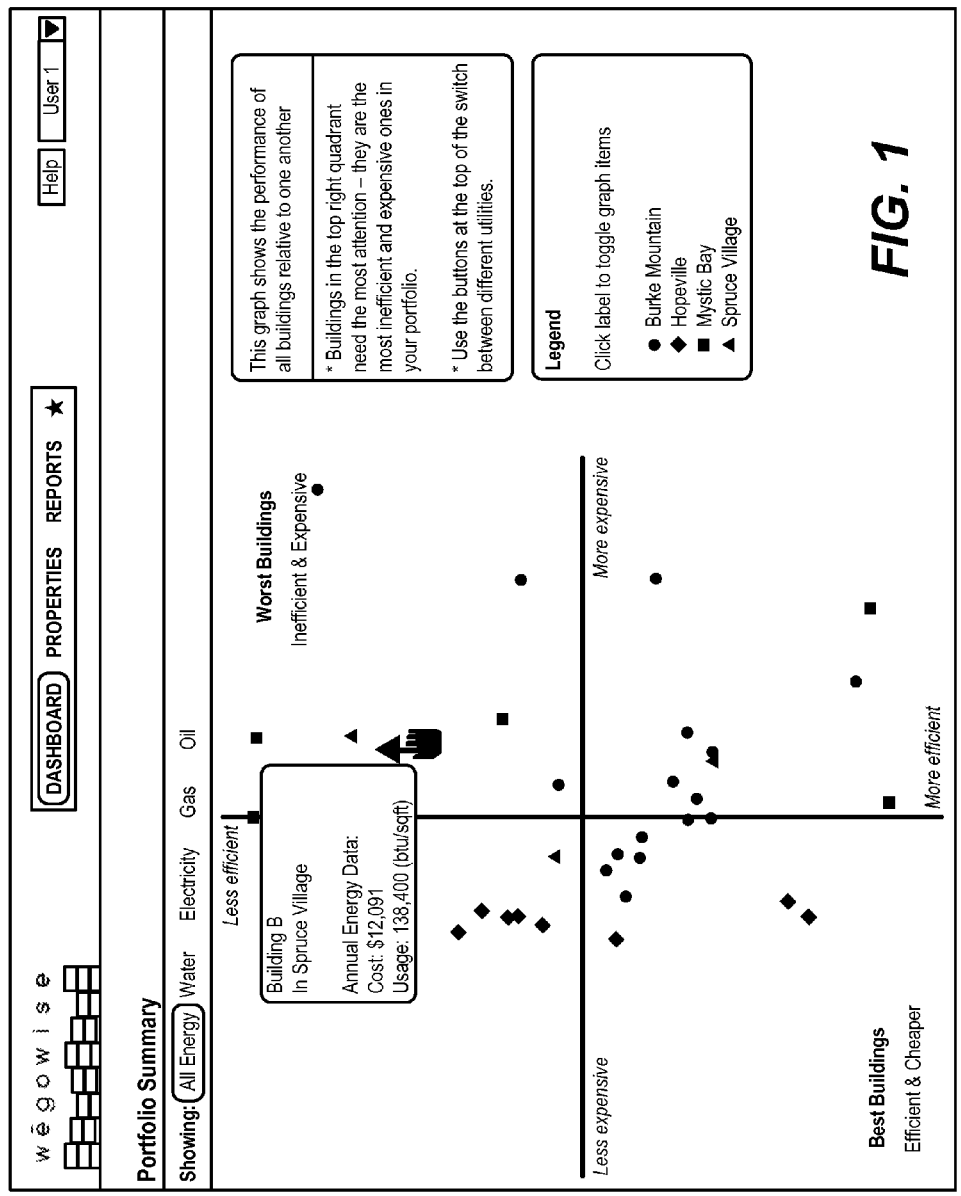
FIG. 1 is an example screen shot of a utilities manager operating in a computer/network environment according to embodiments herein.

Techniques disclosed herein include systems and methods for tracking, visualizing and understanding energy/utilities usage of one or many buildings. Such techniques and methods can be embodied in general as a web-based database or similar system, algorithms, computer code, graphical interface, and any software or hardware used to implement the system. Usage may include data related to quantity consumed, cost, dates, payments, or other related data associated with a utility. The system links building characteristics with energy/utilities use thereby enabling users to view energy usage and cost information at the portfolio, development, building, apartment, or meter levels. While data my be entered at the meter level, the system aggregates data, analyzes the data, and can present processed data as a development or properties level. This technique allows for easy comparison among and between buildings in a portfolio, group, or common ownership. The system provides for quick creation of custom reports to compare buildings across portfolios. These custom reports further enable users to compare energy use of buildings within a given account relative to energy use of similar buildings in a larger database, thus providing meaningful performance benchmarking based on real data.

Embodiments disclosed herein can generally provide utility data organization and display, building performance calculations, and network capabilities. There are multiple embodiments and combinations of embodiments.

Embodiments related to utility data organization include methods of data input, linking utility data with building characteristics, user interfaces, and data retrieval and presentation. Note that utility data refers to public utilities data. As described above, public utilities include any type of commodity or service generally available to the public, and usually associated with real property and related structures such as homes, apartments, office buildings, developments, etc. Public utilities can include, for example, electricity, water, natural gas, heating oil, telephone services, solar energy, wind energy, sewer services, etc. By way of a specific example, the utility data might include electricity service charges including dates of service, amount of electricity used, and location of electricity usage. Note that some public utilities can be locally provided energy or resources such as from a solar energy system installed for a building, or a wind capture system that is off the public utilities grid. A solar energy system, for example, may not have monthly cost data associated with it, but the system can access usage data associated with it, as well as initial and maintenance costs.

For convenience, the system and/or methods disclosed herein will be referred to as a utilities manager.

The utilities manager enables defining developments, buildings, apartments, and utility accounts in a hierarchy, with data from a utility account propagating up the ladder appropriately. This means that a building's utility consumption and/or cost for a specific utility is calculated as the sum of all of the utility accounts within it. The same is applicable for an apartment or development. When utility data initially enters the utilities manager, it is associated with a utility account. When this happens, the utilities manager can automatically update the data associated with all apartments, buildings and developments that are affected by the associated utility account.

The utilities manager is able to handle portfolios of any arbitrary size, and maintain a hierarchy of property definitions regardless of the number of properties.

Figure 4:
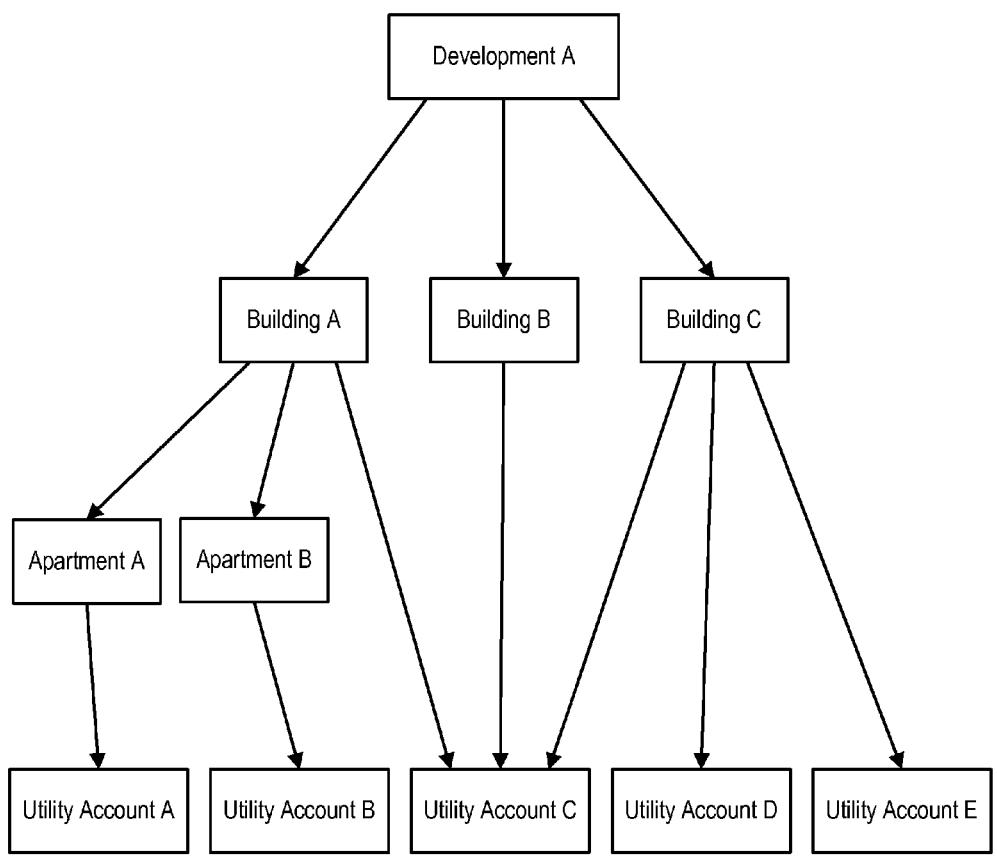
FIG. 4 is a flowchart illustrating an example of a process supporting a utilities manager according to embodiments herein.

FIG. 4 shows a flow chart of how the utilities manager can define properties. For example, a user defines a development. A development can refer to a group of one or more buildings. In FIG. 4, Development A contains Building A, Building B, and Building C. A given building typically belongs to only one development. A given building may contain zero or more apartments. In this example, Building A contains Apartment A and Apartment B, while Building B and Building C contain no apartments.

Each given apartment or building can have one or more utility accounts connected to it. A utility account may have one of several kinds of associations. A utility account may be linked to a single apartment in a building. For example, Utility Account A is associated with Apartment A, and Utility Account B is associated with Apartment B. A utility account may be linked to a single building. For example, Utility Account D and Utility Account E are each associated with Building C. Additionally, a given utility account may be linked to multiple buildings in the same development. For example, Utility Account C is associated with Building A, Building B, and Building C. The configuration of developments, buildings, apartments, and utility accounts can determine how data is calculated via the utilities manager.

The utilities manager can handle arbitrarily dense data streams. Conventional utility accounts generally contain one data point every month or so. Newer ways of metering utility usage, however, allow utility companies or customers to collect data at much more regular intervals, such as daily, hourly, or every 15 minutes. This metering is often referred to as "smart metering." The utilities manager may accommodate all of these data streams in its database. For data points that occur more regularly than once per day, the utilities manager can track the starting date and time, and the ending date and time, rather than just the starting date and ending date.

The utilities manager can account for utility data having disparate time frames by interpolating the data, for example by using linear interpolation techniques, and obtaining equivalent values for the data with reference to a standard temporal window. For example, the utilities manager may calculate equivalent per-month values associated with all utility data. By converting utility data to a consistent temporal reference, the utilities manager can perform calculations on or display utility data in a consistent and meaningful way.

The utilities manager keeps track of the completeness of all data in the system. If a building has N utility accounts of a certain type of utility (for example, electricity), the utilities manager may consider that building to have complete data for a given time frame for that type of utility if it has data for that time frame for all N of the corresponding utility accounts. If a development has N buildings, and the user specifies that they are tracking a particular type of utility for M of those N buildings, the utilities manager can consider the development to have complete data for a given time frame for that type of utility if it has complete data from the M relevant buildings for that time frame. An apartment may be considered to have complete data for a particular utility type if it has data for all utility accounts of that type that it is associated with.

The utilities manager provides a method of allocating a utility account's data to multiple buildings or apartments when that utility account is shared between the buildings. This prevents utility data from being double counted. For example, if a gas (natural gas) account happens to be shared between two buildings, the system allocates that account's data to both buildings such that the total is accurate. The allocation can be based on the square footage of the buildings, the heated square footage only or based on some other building characteristics. For example, if the associated utility account is associated only with common areas of the given buildings, allocation may be based on their common area square footage.

The utilities manager differentiates between different areas or portions of a building that are covered by a specific utility account. Such differentiation enables presenting users with area-specific data within the building. For example, an electric (or any other type) account may be defined as covering a specific apartment, common areas of the building only, or the entire building (common areas and apartments). The user is then able to view data for electric usage within the building for common areas only, apartments only, the entire building, or whatever data has been entered.

The utilities manager may apportion data associated with utility accounts that cover the entirety of a building to specific subsets of a building based on the building's characteristics or based on a ratio specified by the user. This may allow a user to view an estimate of the portion of an entire-building utility account's data that is associated with the common areas of a building versus the apartments within the building.

The utilities manager can automatically retrieve data for a utility account when, for example, the corresponding utility company provides online data access to customers. Users can provide the utilities manager with their username and password for the external utility company website, and the utilities manager can navigate to the appropriate pages on the utility company website, extracting data that is relevant. The utilities manager can ensure consistency of all data extracted and save it to its internal database. The utilities manager can keep track of how recently it last updated a utility account's data and automatically check the utility company website for new data as needed to ensure that a user's utility account data is kept to date up to a certain time frame (for example, 24 hours). In this way, the user can avoid entering utility data by hand.

In some embodiments, the utilities manager automatically retrieves data for multiple utility accounts at once from third-party websites. Often, a user may be able to create one username/password for use with a utility company website and have multiple utility accounts, associated with one or more addresses, visible via a single login. Once a user submits login credentials for a given third-party utility company website, the utilities manager can automatically detect which utility accounts are associated with the login and pull data for all of those utility accounts at once. This means that when the user defines a utility account, the utilities manager may not need to request third-party login credentials because the utilities manager can be configured to know that the utility account is linked to a specific username/password that is already saved in the system. The system can use an email address or another user identifier to automatically update logins for all associated accounts when a given login changes.

The utilities manager can validate accuracy and reasonableness of utility data when collected from third-party websites. Data validation can include checking that certain components of a third-party site look as expected (key pieces of text, titles of objects, etc.) to make sure the utilities manager pulls correct data and detects when a third-party provider has changed their website in some way that impacts data collection. The utilities manager also performs verifications such as checking that an end date is after a start date, dates from multiple data points do not overlap, total cost values are equal to the sum of individual component cost values, etc.

The utilities manager can also convert utility consumption data into a variety of measures of environmental impact. This includes, for example, the ability to convert electric, gas, or oil consumption into the equivalent carbon dioxide (CO2) emissions associated with that consumption. In the case of electricity, this calculation can take into account the geographic area that utility account is located in and the method of electricity generation used in that area (coal versus nuclear, etc.), or if the specific mode of generation for a given electric account is known the utilities manger can use that information instead. Once CO2 data (or other environmental impact data) is calculated based on consumption and other information for a utility account, it can be propagated to apartments, buildings and developments in the same way that any other usage or cost data for the utility account is propagated.

The utilities manager can also track "verified" versus unverified data and present the distinction to users. Data that is collected directly from a third-party (such as a utility company) via automated scripts can be treated as verified, whereas data that is entered manually or modified by a user can, by default, be treated as unverified. Individual fields can be distinctly tracked as either verified or not. A single data point may have a verified start and end date, but an unverified total cost value (if the user has modified a corresponding field).

Data can be uploaded from manually submitted spreadsheets by specifying a layout of a spreadsheet and importing the file. For example, a user can specify that a given spreadsheet has two header rows, that Column A gives an end date, and that Column B gives kWh, and then specifies to the utilities manager a spreadsheet that matches that specified template. The utilities manager can then import the specified spreadsheet and parse data from it and attach the parsed data to a given utility account. This can include performing data validation and allows the user to modify data parsed from the spreadsheet before finalizing the import. When uploading data from a spreadsheet, the import process can verify pre-existing data to make sure there is no duplication, overlap, or other discrepancies.

Imported or otherwise acquired utility data can be presented for multiple buildings (or developments, apartments, or utility accounts) at once in a manner that allows month-by-month comparison of the data as well as full-year sums in an interactive way.

The utilities manager is able to normalize all data for developments, buildings, apartments and utility accounts based on their size, and present this normalized data to the user. This is useful when presenting multiple buildings (or developments, apartments, or utility accounts) at once for comparison, since, for example, two buildings may show the same usage value but one may be twice the size of the other. Viewing unnormalized data may lead the user to incorrectly infer that both buildings are performing with equal efficiency, while viewing normalized data can provide a more accurate representation of efficiency. Similarly, comparing a development with two buildings with one that has two hundred buildings may only be meaningful when viewing normalized data.

Size characteristics for data normalization can include number of buildings, number of apartments, number of bedrooms, square footage, etc. The size associated with utility accounts can be based on the size of the apartment(s) and portions of building(s) that the utility account covers. For example, the size associated with an apartment utility account may be equivalent to the size of the apartment it covers, whereas the size of a utility account that covers the common areas of two buildings may be the sum of the sizes of the common areas of those two buildings.

Referring to FIG. 1, presentation can include a dashboard view or overview of a portfolio of properties. Such an overview can include a scatter plot showing various buildings, with each axis representing a measure of efficiency or cost. By hovering a pointing device over a given property on the scatter plot, more detailed information can appear next to a given property. Note that in FIG. 1, a cursor is hovering over a particular triangle representing Building B in Spruce Village. The location of this property on the scatter plot means that Building B in Spruce Village happens to be inefficient and expensive relative to other buildings within a portfolio. By clicking on this triangle, the utilities manager can show the user a different view related to the associated property, for example a summary view. Developments can be toggled on and off, for example, by clicking on the name of the development in the legend. The presentation can provide indicators to the user of which objects are currently hidden from the view. The scatter plot may also include navigation that allows the user to change what type of utility data is shown in the graph. For example, this may include total energy, water, electricity, gas, and oil.

In another embodiment, the dashboard may also be used to depict the location of all buildings within a user's portfolio overlaid on a map. There can be icons for each building on the map, with information depicting each building's efficiency next to the icon, or with details available upon hovering a pointing device over or clicking on an icon. Clicking a building's icon on the map may take the user to a view related to the associated property, as in the scatter plot. The map view may also include navigation similar to the scatter plot that allows the data to be adjusted from showing one utility to showing another.

Figure 2:
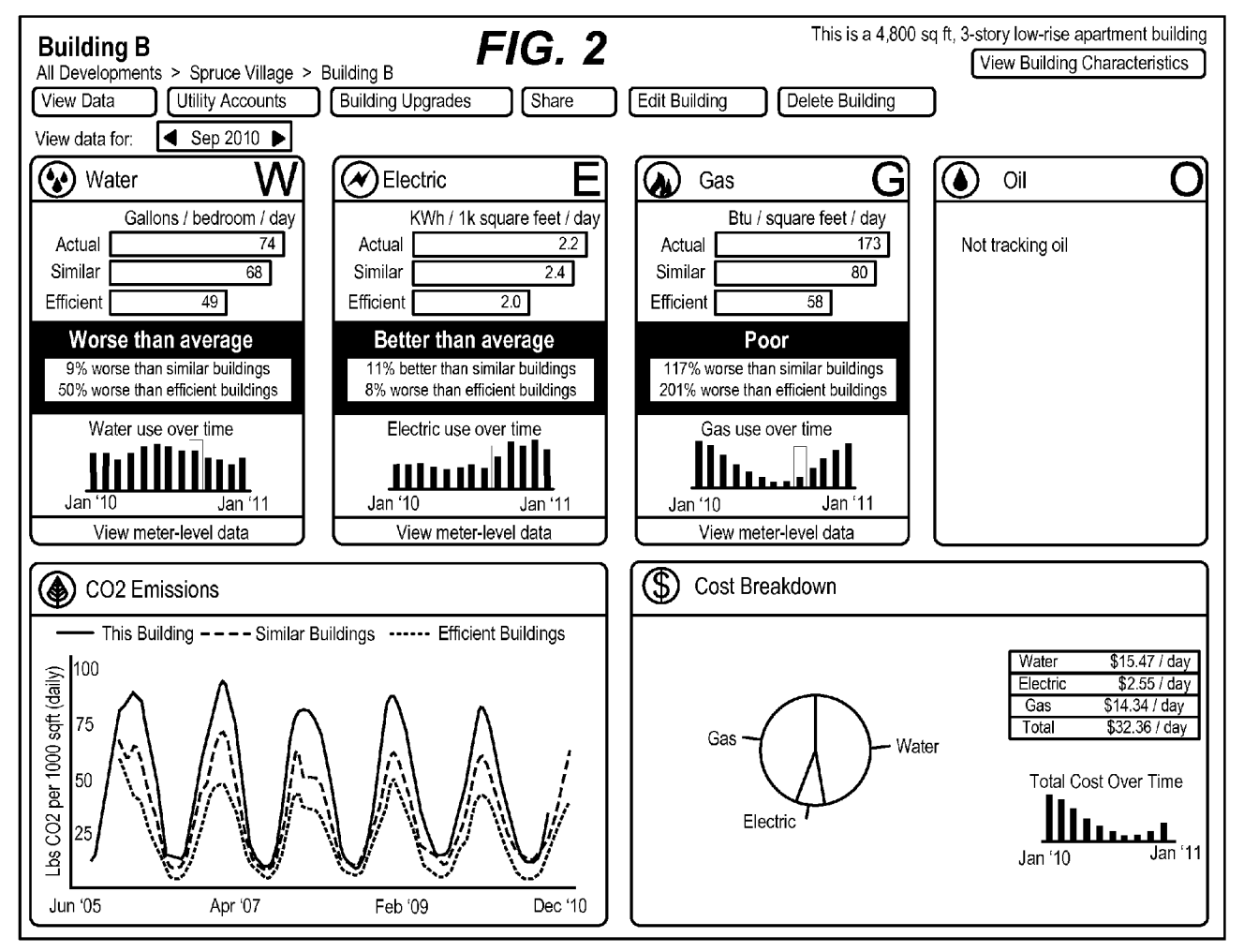

Referring to FIG. 2, presentation can include providing a summary view of all relevant utility information for a building in one screen, including water, electricity, gas, and oil usage for a given month or day or year, along with a comparison of each usage value with the usage value for "Similar" and "Efficient" buildings, a breakdown of total utility costs along with amounts and percentages spent on specific utilities, and a calculation of CO2 consumption based on utility consumption of the given building as compared with Similar and Efficient benchmarks. When comparing usage of specific utilities to Similar and Efficient benchmarks, the utilities manager can show graphically and with actual numeric values the usage of all three, can provide percentage differences, and can provide a ranking of the performance of the building in terms of a given utility based on how it compares to the benchmarks, such as "Poor", "Better than average" or "Excellent". Within each section that shows usage of a specific utility, the utilities manager can also show a small bar graph (often called a sparkline) that depicts the usage in the given month or year compared to nearby months or years, with the current time frame highlighted. The CO2 consumption report similarly highlights the currently viewed time frame, and the cost breakdown (which can be shown in graphical pie-chart form as well as numeric values in tabular form) similarly contain a sparkline showing the currently viewed total cost compared to costs for nearby months or years, with the currently viewed time frame highlighted. A user may navigate to viewing data before or after the selected time frame by using arrows in the graphical interface or through use of keyboard shortcut keys.

Users may have an option within their user preferences to change which benchmarks by default a building may be compared to, if they prefer to make comparisons to specific benchmarks other than "Similar" or "Efficient".

In another presentation, the utilities manager can provide an alternative summary view that can show data for all developments in a portfolio, all buildings in a development, or all apartments in a building. This presentation can be similar to the detail view in that it can show data for many different items in one view. This presentation can also be similar to the summary view for just one building in that it can show data for many different types of utilities in a single view, to allow the user to get a more comprehensive understanding of the state of the items being shown. This presentation can show data for a single month at a time, allowing users to navigate to earlier and later months using a graphical interface or keyboard shortcuts, or showing data for a single year at a time, with a similar mode of navigation over time.

One section of this presentation can have a tabular arrangement of data with each row corresponding to a single item whose data is being shown (a building in the development, or a development in the portfolio, or an apartment in the building). One column of this table can show horizontal stacked bar graphs with distinct colors representing different types of utility usage. Each bar can be graphed on the same scale and in the same normalized units. By default this can be BTU per square foot, but the user can change this default in their user settings. The overall width of the stacked bar indicates the total energy consumer in the building (the sum of electricity, gas, and oil). Another column of the table can show a single bar depicting water usage in a building (for example) normalized by square footage. Other columns can display carbon usage normalized by square foot, total dollars per square foot, and an efficiency score. The utilities manager can calculate this efficiency score based on an algorithm that takes into account the amount of energy and water consumed, as well as one or more building characteristics.

There are many optional or alternative features of this tabular display. Colors can be used to represent what type of data is being shown in each of the bars. For example, electricity is represented by one color, gas by another, oil by a third, and water by a fourth. The same color can be used to represent usage and cost data for the same type of utility. A legend can indicate which color is used to represent which utility. Clicking on a legend item can hide all of the data associated with that utility. Hiding data for a specific type of utility will cause the other bars in the table that are still shown to grow wider to the extent that more horizontal space is available. The order of legend items can indicate the order of the bars as they appear in the report. Colors and layout can be adjusted by dragging items. Placing a cursor over a specific bar can cause a box to appear on the screen, above the location of the cursor indicating a precise numerical value associated with the bar. A user may switch between monthly and yearly views of their data. In the monthly view, the user is shown the total monthly data for each building for the month shown, and in the yearly view they are shown the total yearly data for each of their buildings for the year shown.

By default, users can be shown data for the most recent month for which data is available. Users may navigate backwards or forwards in time, as applicable, to view data for earlier or later months. If the user is currently viewing data for "June 2009", for example, and clicks the back-arrow, all of the charts and numbers will be replaced with the appropriate charts and numbers showing the data for May 2009. If there is no data available for the prior month the user is not shown an option to view data for the prior month, and the same is true of moving forward in time as well. Data can be navigated by month or year or day.

The user may sort data being viewed in the data table according to any of the types of data being shown in the table, such as the name of the buildings, energy usage, water usage, utility consumption, or efficiency score. Users may also choose to sort based on the usage or cost of a specific utility rather than the total energy consumption or total utility cost. This can be done through the use of a drop down menu that appears when the user clicks on corresponding table headers. Other graphs can show total cost of all utilities in a development as a sum of the cost of utilities for all buildings in the development, or total carbon usage per building in the development.

Figure 3:
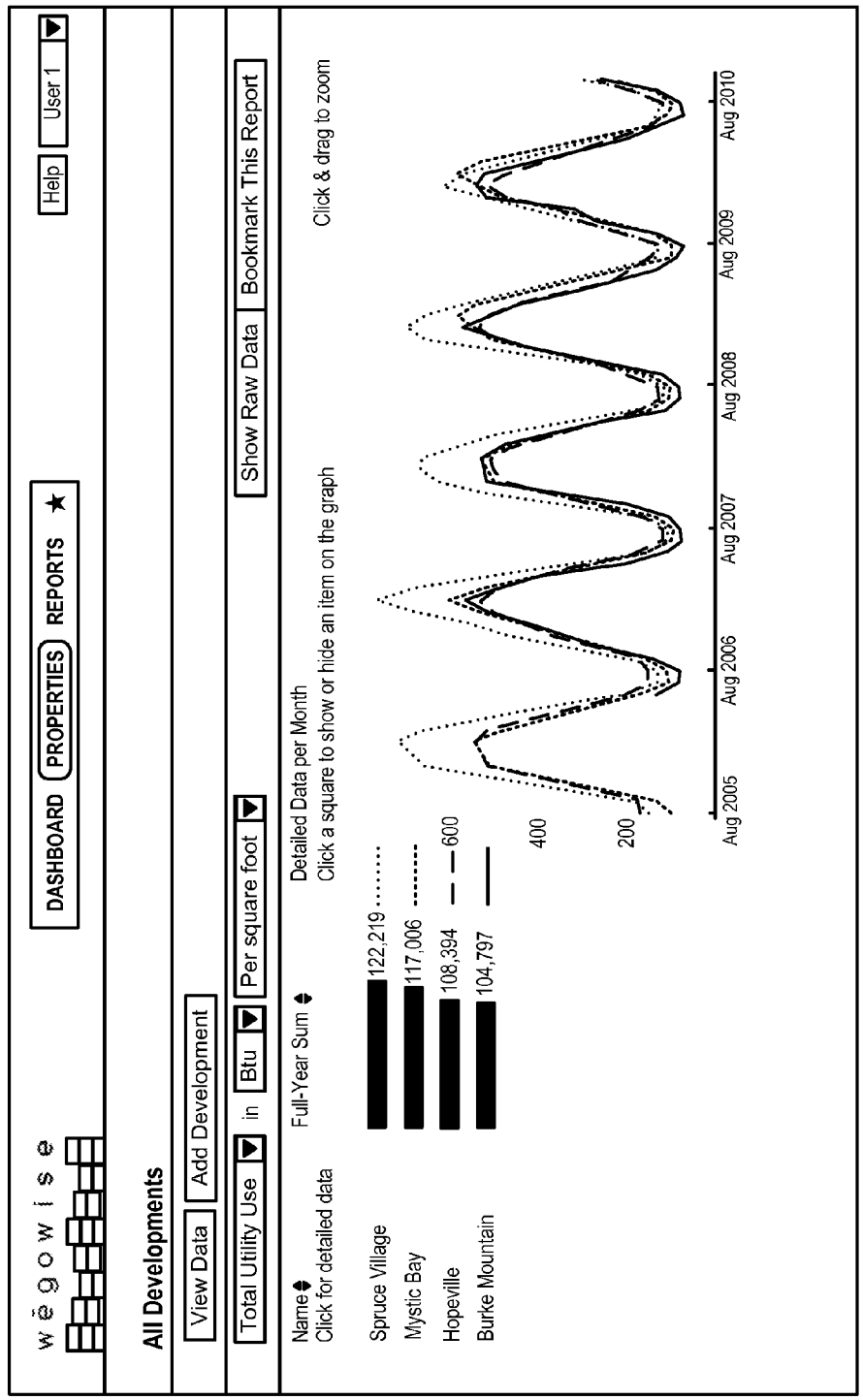
FIG. 3 is an example screen shot of a utilities manager operating in a computer/network environment according to embodiments herein.

Referring to FIG. 3, presentation can include providing a "detail view" of monthly, daily or yearly data for all developments in a user's portfolio, all buildings in a specific development, all apartments in a specific building, or all utility accounts in a specific apartment or building. In this detail view, the user may view a specific type of data, for example Total Energy Use in Btu per Square foot as a line graph showing monthly or daily usage for all items over a period of time (either the entire time frame that the user has data for or some subset thereof) where all items with data are plotted in the same graph so that they can be easily compared with one another. By hovering over a point on a given line in the line graph the utilities manager may show details associated with the given data point, such as the numerical value and units of measure associated with that point as well as additional information about the item represented by the line. This view may also contain bar graphs that show the "full-year sum" of data for the items included in the presentation, where the full-year sum for an item may refer to the sum of the data for that item for the most recent 12-month period for which it has data. The system may utilize various methods and heuristics to calculate the full-year sum, such as inferring missing data, only considering data that has occurred in the past 24 months, etc. The colors of the bars in the full-year sum and line graphs are set to match, and a corresponding legend is provided in the view so that the user can easily identify which items are associated with which bars and lines. The presentation may include many interactive components, such as zooming in on the line graph to change the time frame being shown, toggling individual lines in the line graph on or off to clarify the remaining lines, and hovering over items for further details. By hovering over a bar graph, a corresponding line in a line graph can be highlighted, thickened, or otherwise more prominently displayed, and vice versa when hovering over a line graph. The presentation may indicate to the user when there is incomplete information associated with a given item or when there is some other issue that prevents data from being displayed by displaying relevant messages in the view, such as "Not a full year of data" or "Not all meters defined."

Presentation techniques for showing multiple buildings (or developments, apartments, or utility accounts) at once, such as in the detail view, may include switching between views of different data types and normalizing by different building characteristics. The utilities manager can present drop-down menus to allows users to switch between Usage vs. Cost data, switch which utility's data is being displayed (or view Total Energy data or Cost of all utilities), change which units the data is presented in (Btu vs. Therms vs. kWh for gas usage, for example, or Gallons vs. Btu for oil usage, etc.), and change what the data is normalized by (based on various size characteristics). The utilities manager may only present the user with options for numerator units that are relevant to the selected report type, such that, for example, kWh is not provided as an option for Water usage or Electric cost. The display can also be changed to show outputs such as CO2 emissions or various End-use calculations. Upon selecting a different report type, numerator or denominator, the utilities manager can immediately retrieve the appropriate data, perform the necessary calculations, and update the presentation to reflect the data associated with the newly selected options.

The utilities manager may allow the user to view data in a tabular format in any presentation that compares data for multiple items as in the detail view. In such a presentation, the utilities manager may allow the user to change their view according to drop down menus as described above and refresh the data in the data table accordingly. The presentation may include a link or button for the user to be able to download the data being presented in a generic format that is compatible, for example, with a standard desktop spreadsheet application.

The utilities manager may provide a mechanism for users to export (as an image or PDF document or related format) or print a presentation in order to obtain a copy of it outside of the context of the utilities manager.

When a user is viewing data for buildings, in a detail view or summary view, the utilities manager may provide an option of selecting to view data for the entire building, only common areas of a building, or for apartments in the building. In instances where there is not sufficient information to calculate data for either the entire building and/or only common areas of the building and/or apartments in the building, the utilities manager may utilize a methodology, dependent upon the embodiment, to determine which portion of the data to display to the user by default, and indicate to the user what is being displayed.

The utilities manager enables users to create custom reports to view and compare data for multiple developments, buildings, apartments, or utility accounts within their portfolio at once. Custom reports may allow users to select any set of buildings (for example, if their report covers buildings) to show on one report, even if those buildings are associated with different developments. Custom reports may also allow users to define specific benchmarks and add an arbitrary number of such benchmarks to the custom report.

Creating a custom report may be done by first specifying some basic information about a report such as a name, whether it is a report that covers developments, buildings, apartments, or utility accounts, the type of data that the report will be used to show (which may be presented in a similar manner to the drop downs used in the detail view reports which allow the user to specify the type of data being shown, the units used to display the data, and what size characteristics, if any, should be used to normalize the data), etc.

The utilities manager may allow a user to select the items to include in a custom report through various means. A user can pick specific utility accounts, apartments, buildings or developments to include in their report manually by clicking on the names or addresses of the items to be included in a graphical interface. Alternatively, custom reporting can show data for all buildings within a portfolio that pass a specific set of conditions that are specified by the user, such as those used when defining benchmarks. If no conditions are specified by the user using this method, the utilities manager can include all buildings in the user's portfolio in the selected report. Additionally, custom year-over-year reports can be defined for any development, building, apartment, or utility account such that they may compare utility usage or cost for the selected building (or development, apartment, or utility account) over many consecutive years—both as a full-year totals and line graphs of 12-month periods of monthly data.

When a user chooses to create a custom report based on specifying a specific set of criteria to pick which items to include in the report, the utilities manager may include in the report by default a benchmark showing the benchmarked usage of all buildings (for example, if the custom report is for buildings) that match the same set of criteria. The utilities manager may not include this default benchmark if the custom report is created without a denominator, since benchmarks may require data to be normalized in order to be meaningful.

The utilities manager may provide a presentation for custom reports that is similar to the detail view in that it provides detailed monthly or daily data over time in the form of a line graph with one line corresponding to each item with data, bar graphs showing full-year sum values for each item with sufficient data, many forms of interactivity within and among the various elements in the presentation, etc.

The utilities manager can provide the user with the ability to edit a custom report after it has been created, for example by changing its name, the data being displayed or its units, the time frame data is displayed for, which items (buildings, apartments, developments or utility accounts) are included in the report, and which benchmarks are included in the report. The user can specify specific start and end dates for the time frame, or a relative data range such as "all available dates" or "the most recent 2 years." The user can add as many benchmarks to the report as desired, and can name them.

When viewing a custom report, a user can view the details of what a benchmark represents, i.e., what filters were used to create it, by hovering a pointing device over the name of the benchmark in the report. The utilities manager can show a popup or some other method of user interface to show the relevant details, which may then be hidden when the user moves their pointing device away from the name of the benchmark.

Embodiments related to building performance calculations include benchmarking, usage and cost analysis, and tracking of building improvements.

Analysis and calculations can include weather-normalizing data based on location by pulling temperature records from outside sources.

The utilities manager can perform calculations and present analysis to the user regarding the end-use associated with a given utility account, or groups of utility accounts within an apartment, building or development. End-use refers to the purpose for which the utility was consumed—heating, cooling, domestic hot water, swimming pool heating, etc.

Presenting utility end-use to a user can be based on knowing what functions individual utility accounts provide resources for, along with additional statistical and heuristic information. For example, for a building with gas heat, heating usage can be determined by examining those gas utility accounts that the user has specified cover heat, and performing a regression based on temperature. Other heuristics may also be used, for example by observing that heating use follows a cyclical pattern from one year to the next while cooking and hot water are more constant. The specific statistical and heuristic approaches used to determine end-use may depend upon a number of factors, including which end-use is being calculated (heating, air conditioning, hot water, etc), the characteristics of the specific utility account(s) or building(s), and the embodiment. Heating usage can also be compared relative to outside temperatures, and what percentage of a particularly utility goes to heating as compared to non-heating uses.

The utilities manager may utilize outside information to produce more meaningful end-use information. For example, a heating report may indicate not just how much energy was used to heat a building, but how much energy was used to heat a building relative to the amount that the building needed to be heated (based on outside temperatures). The system may represent this to the user by normalizing data by standard quantitative meteorological metrics used to reflect the demand for energy based on weather, such as Heating Degree Days and Cooling Degree Days. A heating report, therefore may present data in units such as Btu (units of energy) per square foot (normalization based on building characteristic) per heating degree day (normalization based on weather data). Similarly, the utilities manager can automatically tell a user what their building's cooling efficiency levels are in terms of (Btu/square foot/cooling degree day).

The utilities manager can calculate a benchmark of similar buildings to a given building by examining the median or average usage of buildings in a larger database that match a specific set of characteristics that relate to the given building. For example, the benchmark usage of buildings similar to Building A for May 2010 may be the usage of all buildings in a website system that are within a certain geographic distance of Building A, have a size within a certain percentage of Building A's size, and use the same heating fuel as Building A. Exactly which characteristics are used to determine similarity depend upon the type of utility being examined, and what Building A's characteristics actually are. Alternatively, a benchmark label of efficient or inefficient can be given using a different cutoff, such as first or third quartile, or other predetermined measure.

Benchmarks can be added to any custom report, where a benchmark refers to the usage of all developments, buildings, or apartments tracked by the utilities manager, and that meet certain characteristics. For example, via a graphical user interface, a user can create a benchmark of buildings in Massachusetts between four and six stories tall with gas boilers and wood & steel frame construction. Custom benchmarks can be created by users and added to any report, and custom and other reports can be bookmarked.

Benchmarks allow users to compare the performance of buildings (or apartments or developments) to the median (or mean or some other statistical measure) performance of all buildings (or apartments or developments) either in the system or in their portfolio that match certain characteristics.

When creating a benchmark for a custom report, the utilities manager can provide the user with a graphical user interface to specify which characteristics to base the benchmark off of. If no characteristics are specified, the benchmark can include all buildings (or developments or apartments).

Users can specify or filter general types of attributes that a building has, such as "Location," "Size," "Amenities," etc. If the user clicks on one of these buttons, a submenu is animated below it that shows more specific attribute names of the specified type. For example, clicking on a button labeled "Type/Construction" can cause a submenu to be displayed that includes more specific options such as "Building Construction" and "Type of Building"—both of which are specific types of attributes of a building that fall under the more general heading of "Type/Construction." By selecting a given option, a "filter" appears in the main box content. This filter can allow the user to specify a rule based on the selected option, which would limit the report to only include buildings in a portfolio that match the given rule. For example, a filter could specify a wood or steel frame building. When a user modifies defined rules by adding, changing, or removing a rule, the utilities manager may specify to the user how many buildings (or apartments or developments) pass the given set of rules, within the entire system and/or within their portfolio. A user may remove a created rule. Users may add or remove as many rules as they wish. The system can verify that all of rules make sense (for example, that square footage must be a number). The utilities manager can identify when a user chooses to create a benchmark that does not have statistically sufficient data. In such a case the utilities manager may notify the user and allow them to create the benchmark, but not display data for the benchmark in any reports until there is sufficient data to calculate the benchmark.

Benchmarks for apartments may be calculated based on the characteristics of the buildings the apartments reside in. For example, a benchmark can be calculated for all apartments that are in 4-story modular homes in Boston.

The utilities manager can automatically update benchmark data based on new apartment, building, and development data in the system.

Users can also define upgrades performed to a given building, including specifying before and after states of the building, and cost and expected savings of the upgrade. The utilities manager can then automatically generate a report displaying utility usage in a year prior to the upgrade as compared to the year after the upgrade (such as with overlaid line graphs), along with a description of actual savings versus projected savings. The user can select to view the effect of an upgrade over any specified period of time, for example a year before and after the upgrade, or six months before and after the upgrade, etc.

The utilities manager can calculate a ranking or score for a particular building by examining the median or average usage of buildings in a larger database that match a specific set of characteristics that relate to the given building. The utilities manager can analyze, for example, the usage of a particular building in relation to other similar buildings on a normal distribution centered on the median, to derive a ranking or score that can be presented to the user. The utilities manager may use many pieces of information related to the building (including its data, its characteristics, upgrades performed on it, etc.) as part of a statistical algorithm, which may also encompass certain heuristics, and can involve comparisons with various benchmarks and other buildings.

The utilities manager can forecast a building's utilities consumption and cost and provide reports for budgeting and planning purposes. The utilities manager can consider a building's historical consumption pattern, derive a future consumption level, combine this likely consumption pattern with inputted or forecasted utility rate information, and calculate a building's forecasted utilities expenditures for the future. The utilities manager can also provide comparisons between actual and budgeted utilities consumption and expenses.

The utilities manager can track utilities payments and flag any utilities bills that are due or overdue and provide users with an accounts payables report. When the user views data for an individual meter, the utilities manager can also provide graphical representations of money spent on various components of utility bills, including late fees, supply charges, delivery charges, demand charges, customer charges, etc. The accounts payable report as well as other utility account views can present data in tabular format as well as a variety of graphical formats including stacked line and bar charts and pie charts.

The utilities manager can provide users with a payback or internal rate of return calculations for a particular building upgrade. This can be done, for example, by analyzing existing data on actual building upgrade costs and savings, and providing the user with projected cost, savings, and return calculations on a upgrades being considered but not yet implemented.

The utilities manager can recommend building upgrades for a particular building depending on its existing utilities use and cost profile. For a given budget, the utilities manager can recommend an allocation of that budget among recommended building upgrades. This may be done by examining a large group of possible building upgrades based on the building characteristics, projecting a cost, savings and return on those upgrades as described above, and optimizing the resulting projections to pick the upgrade(s) that maximize return while falling within the budget.

Other embodiments relate to networking capabilities. Users can share data with other system users by searching for names, organization names, or usernames. Users are able to specify if they wish to share their data as view-only access or edit-level access. Access may be granted for a development (which also provides access to all buildings and data within the development) or to an individual building or apartment. Access may be increased, decreased or eliminated at any time.

The utilities manager includes authenticating secondary users for the purpose of sharing. For example, User A desires to provide User B with edit-level access to any data. User A must verify User B's identity prior to this grant of access. User A provides the utilities manager with a security question that User A believes that User B will know the answer to, but that others will not. The utilities manager sends an email to User B asking User B to answer the security question. User B provides an answer, and User A receives a notice of this answer. User A may then either choose to accept the answer, which constitutes verification of User B's identity, or deny the answer, which constitutes refusal of User B's identity. Until such a time as User B is asked to verify User B's answer and provides a response, the verification is left as pending and edit-level access is not provided. In other words, a given user defines how to verify another user.

The utilities manager can indicate to a user via visual and user interface cues the distinction between their own developments, buildings and apartments, or those that have been shared with them. If a User A has access to view or edit a building from User B, but does not have access to view the development that the building is in, User A will see the building's development among their list of developments (with a visual indicator that it is owned by User B) for the purposes of being able to click on the development to see data for the building within it. User A will not, however, have access to view any data for the development. Additionally, User A will not be able to view any information about any other buildings in the development that have not been shared with them.

The utilities manager may reserve certain functions that are only allowed to be performed by the user that "owns", or originally defined, a given development, building or apartment. These functions may include the ability to share the development, building, or apartment with another user.

Users may share data with multiple other users through further social networking capabilities such as the creation of groups. A group may be created by a user who invites other users to join that group. A group may be specified to allow certain access permissions for all users, such as allowing all users within the group to see each others' data, or allowing users to only see anonymized data of others in the group, or allowing users to only see benchmark data based on the members of the group. The utilities manager can provide an interface for group members to compare their performance against one another and obtain a resulting ranking based on their performance within the group. The utilities manager can provide a mechanism for one group to compare their aggregated or benchmarked performance against the aggregated or benchmarked performance of another group.

Groups may be created within the utilities manager or on preexisting external social networking sites that provide an interface for the utilities manager to obtain necessary information about the group, such as its membership. For supporting external social networking sites, the utilities manager can export comparison information, performance information, benchmarks, rakings, etc. to be displayed on external sites for individuals participating in the group.

The utilities manager may allow users to bookmark reports, either detail view and/or summary view and/or building upgrade reports and/or any custom report, for the purposes of being able to conveniently access the report at any time in the future. This may be done by clicking clear user interface components, such as buttons indicating text such as "Bookmark this Report." Upon selecting to bookmark a report, a user may be prompted to select a title for their bookmark. Bookmarked reports may be accessed by the user through a drop-down menu visible from the main top-level navigation of the utilities manager. The user can access bookmarked reports immediately no matter what page within the utilities manager they have currently navigated to. The utilities manager can provide a method for users to rename, delete, or sort their bookmarks via a bookmark manager interface. If a presentation is dynamic, such as a detail view where the user may select to change what is being shown through the use of drop-down menus, bookmarks can track the state of the dynamic report at the time it was bookmarked and present the user with a view that shows the view with the same dynamic state as when it was bookmarked.

The utilities manager can provide various features for website navigation to enable users to navigate among pages to perform different actions. As shown in FIG. 1, the utilities manager can provide a set of links to the top-level portions of a website, which can include links labeled "Dashboard," "Properties," and "Reports." A given web page can include hierarchical navigation cues (also known as "breadcrumbs"), as well as data identifying a building or buildings associated with a given page.

The dashboard can be used to show a presentation in the form of a scatterplot as depicted in FIG. 1 and discussed earlier. The dashboard can also be used to provide the users with notices regarding their account, information regarding sharing data with other users, a map view in which they may see all of their properties on a map, and other views.

The properties section of the website may be used to show all default presentations of data related to viewing developments within a portfolio, buildings within a development, apartments within a building, meters within an apartment or building, and summary views of all developments, all buildings in a development or a single building or apartment. The properties section may also be the location where data is entered, shared, deleted, and other such actions performed. Within individual pages there may be a secondary level of navigation for actions relevant to the given view. For example, when viewing a page that is related to a single development there may be navigation to "Add a Building", "Edit Development", "Share Development", "Delete Development", etc. When viewing a page that is related to a single utility account, there may be navigation specific to that utility account and its context. Pages may include a tertiary level of navigation at times as well.

A user can access custom reports through a "Reports" link on the main site navigation, as shown in FIG. 1. If there are no existing custom reports, then the utilities manager returns a form to begin creating a new one. When there are existing reports, a list of all existing reports can be displayed along with some details about those reports. Users are able to sort this list based on any of the characteristics, and can view an individual report by clicking on its name.

A user can edit their login information associated with using the utilities manager in a separate section of the site easily accessible via navigation from any page via a distinct link or button.

Users may access bookmarked reports via a report bookmark icon, button or link located with the top-level navigation for the utilities manager. The user may hover a pointing device over this icon, button or link to see a drop-down list of all bookmarked reports and immediately click on the link for a report to see it.

A user may hover a pointing device over the Properties item in the top-level navigation to see a similar drop-down that shows a listing of all developments in the users' portfolio. Upon hovering a pointing device over a development name, the user may see the list of all buildings associated with that development on a secondary list located horizontally adjacent to the list of developments in the drop-down. The user then can have the option of clicking on the Properties link itself to view all developments in the portfolio, clicking on a particular development to view all buildings within it, or click on a specific building.

Regarding defining properties, a user can begin by defining a development. To do so, a user can complete a form that asks for basic data of the development. Such data can include: name of development, number of buildings, property manager, legal owner, and so forth. After a user has defined a development, the user may choose to define another development, or begin to start defining buildings for the first development.

The utilities manager can track a relatively large number of characteristics for buildings, which can be used in calculations and displays for a variety of purposes, including normalizing data or calculating benchmarks. The utilities manager can ask the user to submit characteristics of a building(s). Such characteristics can include: address, year built, type of residence such as single family residence as well as sub-types of single single-family residences, whether building is low-income housing, predominant resident category, type of construction, existence of a basement and extent of climate control in basement.

Size is another characteristic with several aspects such as: Gross building square footage, Total size of apartments, Size of basement if applicable, Number of stories, Number of bedrooms, etc. Common areas can also be separately identified by size. Basements can be distinguished by whether they are heated or not. The system can then adjust building square footage accordingly for energy usage calculations.

Other characteristics include: green certifications (energy efficiency certifications), which utilities are consumed in the building (electricity, natural gas, fuel oil, water), which utilities have separate accounts for each apartment, who is responsible for payment of utilities used in the building (landlord/owner or tenant), type of heating fuel (electricity, gas, or oil), type of heating system (selectable from a list), type of cooling system (selectable from a list), type of hot water fuel (electricity, gas, oil or solar), and type of hot water system.

Characteristics can also identify facilities contained in a building such as: laundry and what type of dryer fuel is used (gas or electricity), number of elevators, ventilated parking garage, and swimming pool including whether the swimming pool is seasonal or year-round, heated, and if so how is it heated (electricity, gas, or solar).

The utilities manager can verify that the characteristics of a building are internally consistent, and consistent with the development the building is in. There can be several checks to verify consistency. For example, gross building square footage must be at least the sum of the apartment and basement square footage. Heating, hot water, and facilities fuels can only have a particular value if the building is marked as consuming that type of fuel. The number of buildings that can be defined in a development is limited by the value the user entered for the number of buildings in the development's characteristics. The building cannot have individual utility accounts for each apartment for a resource that is not consumed in the building. The utilities manager can notify a user of incomplete data, or invalid data, and provide visual markers are used to highlight the erroneous fields.

The utilities manager can designate buildings as being of a particular type according to their characteristics. The user may specify this type for some buildings, for example for single-family buildings. For multi-family buildings, however, there is no clearly accepted or widely known nomenclature that is broadly used. Utilities manager can therefore designate buildings based on their size and other characteristics, for example including the number of apartments they contain and their height in terms of the number of stories/levels. Some example building designations can include low-rise, mid-rise, or high-rise apartment buildings. If the utilities manager designates the categorization of the building, the user is informed of this designation after a building has been created.

Building characteristics can be received by the system through various means. The user may specify characteristics manually. The system may allow the user to import a spreadsheet of building characteristics that matches a predefined format. The building characteristics may also be obtained automatically by the system from external sources, including official city or town records, external Internet services that provide real estate information, or other sources. The utilities manager may obtain some building characteristics from one source and allow the user to modify or supplement the obtained characteristics through manual input.

Buildings can be saved as drafts. By doing so, the user can fill in some of the characteristics of a building at one time and fill in other remaining characteristics at a later time. If a user has already defined one or more buildings in a development, the user may easily copy over the attributes from an already defined building to a new building currently being defined. The form used to define a new building is then filled in with the characteristics of the existing building the user has selected, except for specific fields, for example its street address. The user may still alter any of these fields before saving. This function saves users time since buildings in the same development are often very similar to one another.

After a user defines a building, they may be asked to specify the total number of accounts for all utilities consumed in the building. If a utility has individual apartment meters, the user may be asked to specify the total number of apartment accounts and the total number of other non-apartment accounts. If a utility account does not have individual apartment meters, the user may be asked to specify the total number of accounts. If a utility is not consumed, or not tracked, in the building, the system may not ask for any details to be specified. The order and specific manner of details asked by the system may depend on the embodiment.

The user is able to define new utility accounts for a building if the building consumes the given utility. Links can be displayed for each of the type of utility. Following one of those links can allow a user to specify complete details for that type of utility in the given building. This includes being able to define new utility accounts. Creating a new utility account can involve several steps. There can be alternative or additional navigation available through the utilities manager to accomplish the same tasks.

Figure 6:
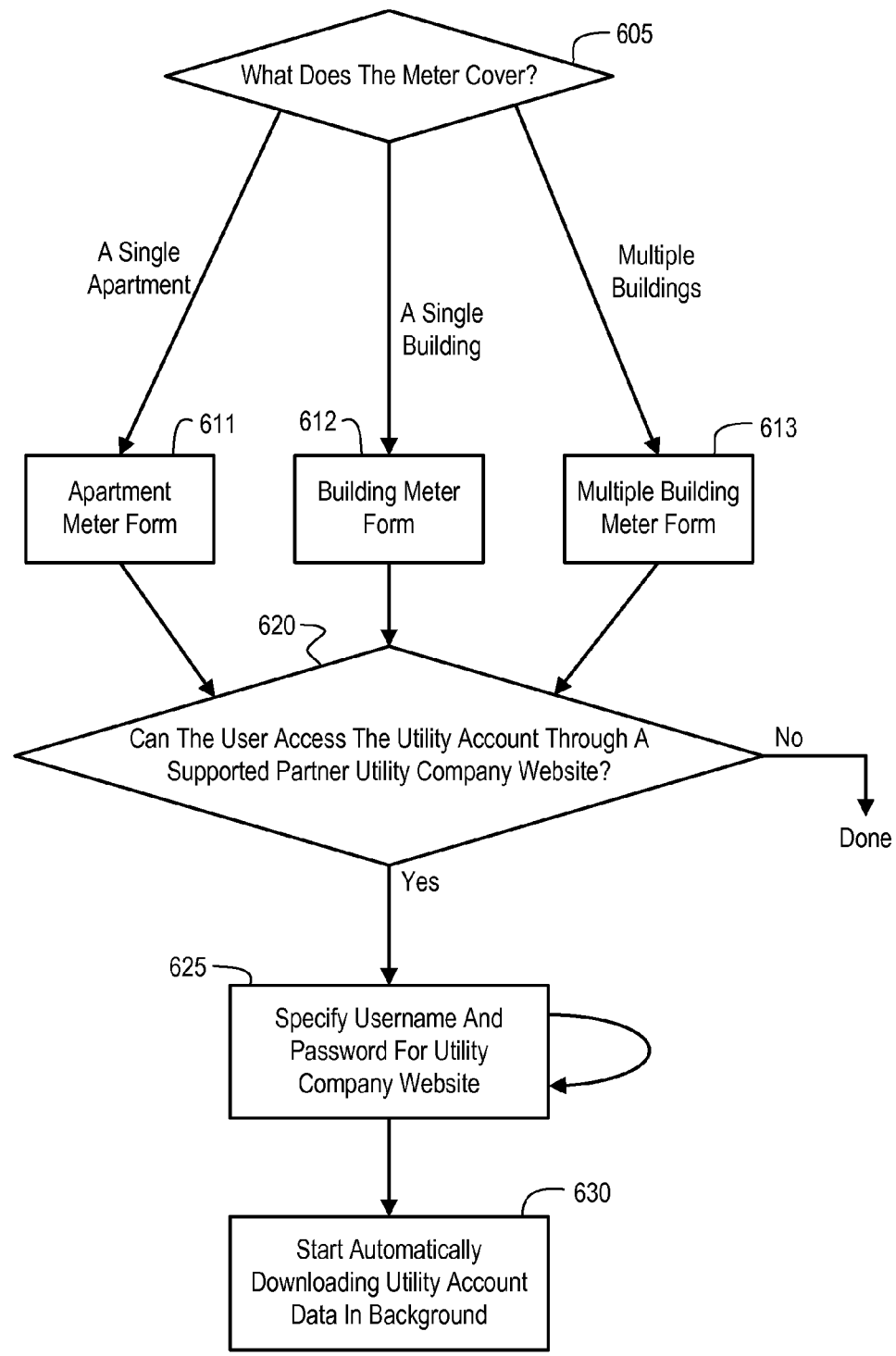
FIG. 6 is a flowchart illustrating an example of a process supporting a utilities manager according to embodiments herein.

FIG. 6 illustrates a flow chart for one method of defining new utility accounts. In general, in step 605, the utilities manager queries what a given meter covers. This could be a single apartment, a single building, or multiple buildings. Depending on a response, the utilities manager returns a corresponding form in steps 611, 612, and 613. Next the utilities manager identifies whether the user can access the account via a supported partner utility company website (step 620). If yes, then the utilities manager can specify the username and password for the utility company website (step 625) and begin automatically downloading utility account data (step 630). Step 625 can be repeated for multiple utility company interfaces. For example, a utility account may be associated with one provider that supplies the utility and a different provider that delivers it. Note that the order of steps in FIG. 6 is used to illustrate one method that the utilities manager may take to allow a user to define a new utility account; questions and steps may be ordered differently in order to achieve the same end result.

Now, describing FIG. 6 in more detail, completing details about the utility account (step 605) can include requesting the user to specify an account number, the name of the utility company, whether or not a third-party is used to supply the utility delivered by the utility company, the name of the third party supplier if so, and an option for users to enter notes about the account for themselves. There can also be fields that are dependent upon the scope of the utility account. If a utility account covers a single apartment, the user can be asked to either pick that apartment from a drop-down list of apartments they have already defined, or to define the apartment if it has not already been defined. The fields required to define a new apartment may include that apartment's square footage, number of bedrooms, and unit number. If a utility covers a single or multiple buildings, the user may be asked to specify if the utility account covers the entirety of the building(s), only common (non-apartment) areas of the building(s), or other space designations within the building(s). If a utility account coves multiple buildings, the user can be asked to specify how many buildings it covers. If the user is defining an account for the same type of utility that is used to heat the building, the user can be asked to specify if the account covers heating. They may also asked to specify this information for cooling, hot water or other possible end uses of the utility, and may optionally manually specify additional end-uses for the account.

If the given utility company that the user specifies as being associated with a utility account is a supported utility company that provides online data access to their customers, the utilities manager can ask the user to provide the login information they use to access their account on the utility company's website. This is used as part of the utilities manager's automatic data collection.

When a user enters login information for an outside utility company, the utilities manager can verify the information with the outside utility company website, and inform the user whether the login information worked, and the utility account was found under that login, whether the username and password the user provided did not work on the outside website, and whether the username and password did work, but the account they specified was not found when logging in to the utility company website with the given username and password. In a scenario where the utilities manager is not able to successfully locate the utility account electronically via the utility company website, the user can have an opportunity to re-enter valid login information.

If a user has specified that a separate company or service is used to supply the utility than the utility company that delivers it, or if the utilities manager is able to detect that this is the case through its interaction with the utility company website, the user may be asked to specify additional information associated with the third-party utility supplier. This may include login information for the third-party supplier website, if the supplier provides electronic data access.

To define apartments in a building a user can define an apartment as a part of the process of defining an apartment-level utility account. Alternatively, the user may define apartments directly through one or more navigation links available through the utilities manager.

If a user has already defined a utility account that covers multiple buildings, the user can easily link that utility account to additional buildings. When the user follows the links to specify a building's information for a specific type of utility, for example, the user can see a button that allows the user to link the building to an existing utility account, as well as a link to create a new utility account. A "link" button can be displayed if there are utility accounts available for the user to link to the building the user is looking at.

The utilities manager can ensure data consistency and inform the user of all information regarding the utility accounts in corresponding buildings. The utilities manager can display how many utility accounts of a given type are left to define. As the user creates accounts this number is updated. The utilities manager can limit a utility account that covers multiple buildings from being linked to too many buildings. The utilities manager can prevent a user from creating more utility accounts of a given type, or a given scope, than the user has specified for the building. Throughout the entire process of defining utility accounts, the utilities manager can provide clear visual indicators to make it clear to the user which stage of the process they are in.

FIG. 5 shows one presentation the utilities can use to indicate the progress of creating various utility accounts. Note that in this figure, electricity accounts have been successfully completed, while natural gas and water accounts are still incomplete.

The utilities manager can support importing, manipulating, and viewing usage and cost data for electricity, natural gas, fuel oil, and water. A typical piece of utility data can correspond to one utility bill. A given data point therefore can refer to a particular time frame—in that the data point has a start date and an end date. The data point can contain a number of values (relating to utility usage, cost and impact) corresponding to that time frame. Users may import, view, and edit data in a variety of formats. For example, gallons for water, kWh or kW for electricity, and Therms/BTU for natural gas and oil. Cost data can include total cost, delivery, demand charges, and associated costs.

The utilities manager can convert data to many different units. For example, a user may import Gas data in units of CCF (hundreds of cubic feet), view CO2 emissions in metric tons instead of lbs., or see electric usage in units of BTUs instead of kWh.

The utilities manager can combine disparate types of data wherever this makes sense. For example, it may determine total energy usage by converting electric, gas, and oil usage to a single metric and adding them up.

The utilities manager can also ensure validity of data. The utilities manager performs a number of validations on data that enters its database including electric, natural gas, oil, and water data. Some example validations can include: every data point is required to have a start and end date, with the start date occurring before the end date; two data points for the same utility account cannot overlap in terms of their start and end dates; data point can contain at least one cost, usage, or impact value; and numerical values can appear in proper format, and within real-world ranges.

Importing data for utility accounts can be automatic, manual, or a combination of the two. Often the utilities manager will automatically obtain data for a utility account via the utility company website using a username and password provided by the user. This has been discussed earlier.

The utilities manager can automatically populate data for utility accounts that a user has defined. This can be done either when the utility company is a data partner, or when the utility company provides their customers with online access to their data. In both of these scenarios, users first authorize the utilities manager to collect utility data on their behalf.

When a given utility company is a data partner, the partnering utility company can provide the utilities manager with direct access to user data in a variety of different ways. Utility companies store data in their own database structure, and can provide the utilities manager with a way of accessing this data. There are several procedures that can be used.

In one procedure, the utilities manager sends utility company information regarding which users it has permission to collect data for. This may be done electronically as users provide authorization, in which case any relevant authorization details the utility company requires are also sent, or it may be arranged separately as part of other business transactions (offline). The utility company collects data from its internal database(s) and exports them in a common electronic file format, such as, for example, Comma Separated Value (.csv) file, or a Structured Query Language (.sql) file. The utility company stores exported data on a server, and provides the utilities manager with a method of accessing the server. The utilities manager saves the file from the server and imports the data within it into its internal database.

Different utility companies may provide different amounts of data at differing intervals. For example, a utility company may choose to supply the most recent year's worth of data for every single utility account that the utilities manager requests, or they may choose to supply only the most recent data point for those accounts. The utility company may also provide updated data on a daily or weekly basis, for example, and provide data according to a set of rules.

Example rules can include: for every utility account the utilities manager requests data. It specifies, as part of its request to the utility company, whether or not any data has already been retrieved for the account, and if so, the date of the most recent data point that has been retrieved. For accounts that have not retrieved any data in the past, the utility company provides as much historical data as possible. For accounts that have retrieved data in the past, the utility company can provides only data that is more recent than the most recently retrieved data.

The utilities manager is able to accept any usage or cost data about a utility account that a utility company has, in whatever metric the utility account stores the data.

Data can also be imported via spreadsheets. Users may import spreadsheets of utility usage and cost data directly into the utilities manager. This is useful when either they have accounts with utility companies that are not yet supported by the utilities manager, or when they wish to import historical data that goes further into the past than the data available on the utility company's website.

For spreadsheet import, the utilities manager does not need to specify how the user must format a spreadsheet. Instead, the user is able to format the spreadsheet in any manner, and then define the format of the spreadsheet on the utilities manager. Once they have done so, the utilities manager is able to parse the data from the spreadsheet and convert it into a format that is saved into its database. Importing spreadsheet data can involve defining an import template, and uploading files and verifying data.

For defining an import template, a user starts by defining a template that specifies characteristics of a particular spreadsheet. This template consists of a few pieces of information, for example a name of the template. The system can store user created templates in its database, so that users can define a template once and import as many matching spreadsheets as they would like. The user can define which row the data starts on (this allows for spreadsheets to have heading information). Formats of any date fields in the spreadsheet can be indicated. Mapping data fields to columns can be defined. For example, referring to FIG. 7, a user has specified that Column A of a spreadsheet contains Therms usage information, column B contains the end date of a meter reading formatted as "mm/dd/yy," and column C contains the total charge associated with the data point.

A given spreadsheet may contain more information than what is specified in the template. Any extra columns not explicitly mapped will be ignored without error. In addition, the system can accommodate standard numerical formatting, including dollar signs for cost values, commas and decimal points, etc. Before saving a template, a user is able to preview what the spreadsheet would need to look like in order to accommodate the template settings they have chosen. FIG. 8 shows an example preview of a given spreadsheet for the user to verify.

If a user has already created a template that matches a spreadsheet to import, the user does not need to create another template. The user can instead simply choose the existing template from a list, verify that the preview matches the template selected to use, and continue to the next step.

Once the user has specified a template that matches a given spreadsheet, the user uploads the file from to the utilities manager. The utilities manager is able to parse all standard spreadsheet file formats, including comma separated value files and Microsoft Excel files. If a file cannot be recognized as a spreadsheet file by the utilities manager, an error message indicates that the file is invalid. If the user uploads a valid spreadsheet file, the utilities manager attempts to parse the data from the file. At this stage, either the system detects that not all of the data is valid (the validity of data has been described earlier), or it is. If the data is invalid, the user is asked to correct the information it parsed from the spreadsheet to produce valid data. If the data is valid, the user is still given the option to change the data that has been parsed from the spreadsheet, but is not required to.

For example, suppose a user tried to import a spreadsheet with three columns and five rows, using the template shown in FIG. 7. Consider that row 1 indicates a file name, row 2 lists column headers Therms, Reading Date, and Total Cost, and Rows 4-6 have data values. Row 4 lists 10 Therms, Jan. 2, 2000, and $12.00. Row 5 lists 12 Therms, Feb. 2, 2000, and $14.00. Row 6 lists 10a Therms, Mar. 2, 2000, and $11.00.

Row 1 and row 2 would be ignored because the template specifies that the data starts on row 3. Row 3 would be parsed as a data point corresponding to 10 Therms of gas usage, costing $12.00, with an end date of Jan. 2, 2000 and an unknown start date. Since Jan. 2, 2000 is the earliest start date among all of the data points in the spreadsheet, there is no way to make a reasonable assumption regarding what the start date should be. Therefore, the system can ignore row 3.

Row 4 can be parsed as a data point corresponding to 12 Therms of gas usage, costing $14.00, with an end date of Feb. 2, 2000, and a start date of Jan. 3, 2000. Even though the start date is not explicitly stated, the utilities manager is able to determine what it should be by the structure of the spreadsheet. The utilities manager can be programmed with a number of intelligent heuristics like this to produce a simple user experience.

Row 5 is recognized as having invalid data, since the spreadsheet states that the Therms usage value equals "10a" which is not a valid number. The spreadsheet is therefore recognized as having two data points that could potentially be imported into the system, one of which must have its invalid Therms value corrected before the data can be saved. The utilities manager displays this information to the user and allows the user to correct the invalid data point and complete the data import. Once the utilities manager detects that all the data being imported is valid, the data can be saved and the system's database is updated accordingly.

The utilities manager also enables manually added or edited data points. Users also have the ability to manually add individual data points to a utility account by navigating to the page for the utility account and clicking on a button to add data and specify any additional relevant fields for the new data point.

In other embodiments, the utilities manager may allow users to specify various user preferences that control what views are shown to the user by default or the manner in which views are shown. These preferences might include whether the user should see a detail view or summary view by default when they navigate to view data for a building, what types of benchmarks should be shown in a summary view for a building, and what units should be used when displaying data in a summary view for the entire portfolio or a development.

Figure 12:
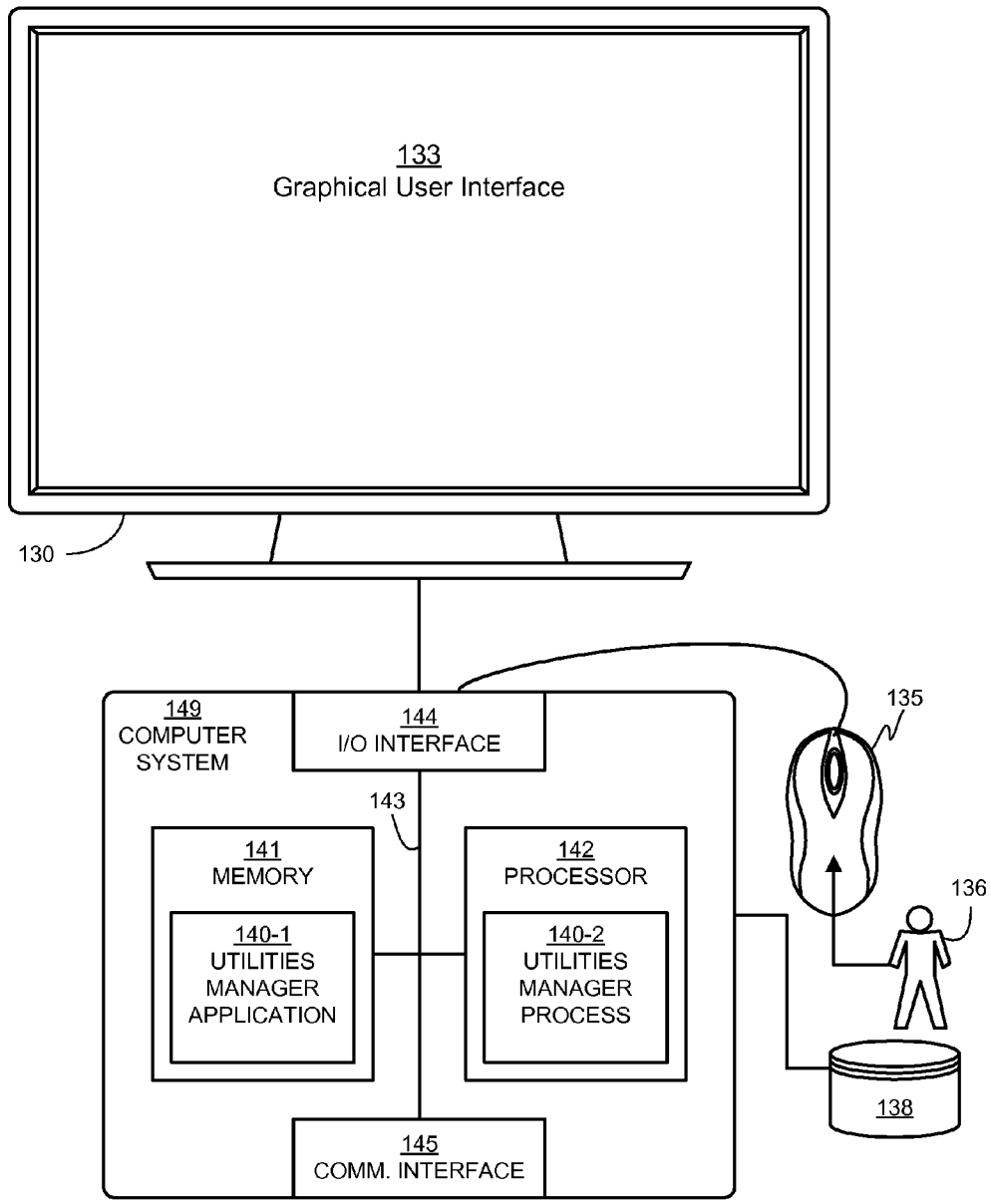
FIG. 12 is an example block diagram of a utilities manager operating in a computer/network environment according to embodiments herein.

FIG. 12 illustrates an example block diagram of a utilities manger 140 operating in a computer/network environment according to embodiments herein. Generally, FIG. 12 shows computer system 149 displaying a graphical user interface 133 that provides a utilities management interface. Computer system hardware aspects of FIG. 12 will be described in more detail following a description of flow charts.

Functionality associated with utilities manger 140 will now be discussed via flowcharts and diagrams in FIG. 9 through FIG. 11. For purposes of the following discussion, the utilities manger 140 or other appropriate entity performs steps in the flowcharts.

Figure 9:
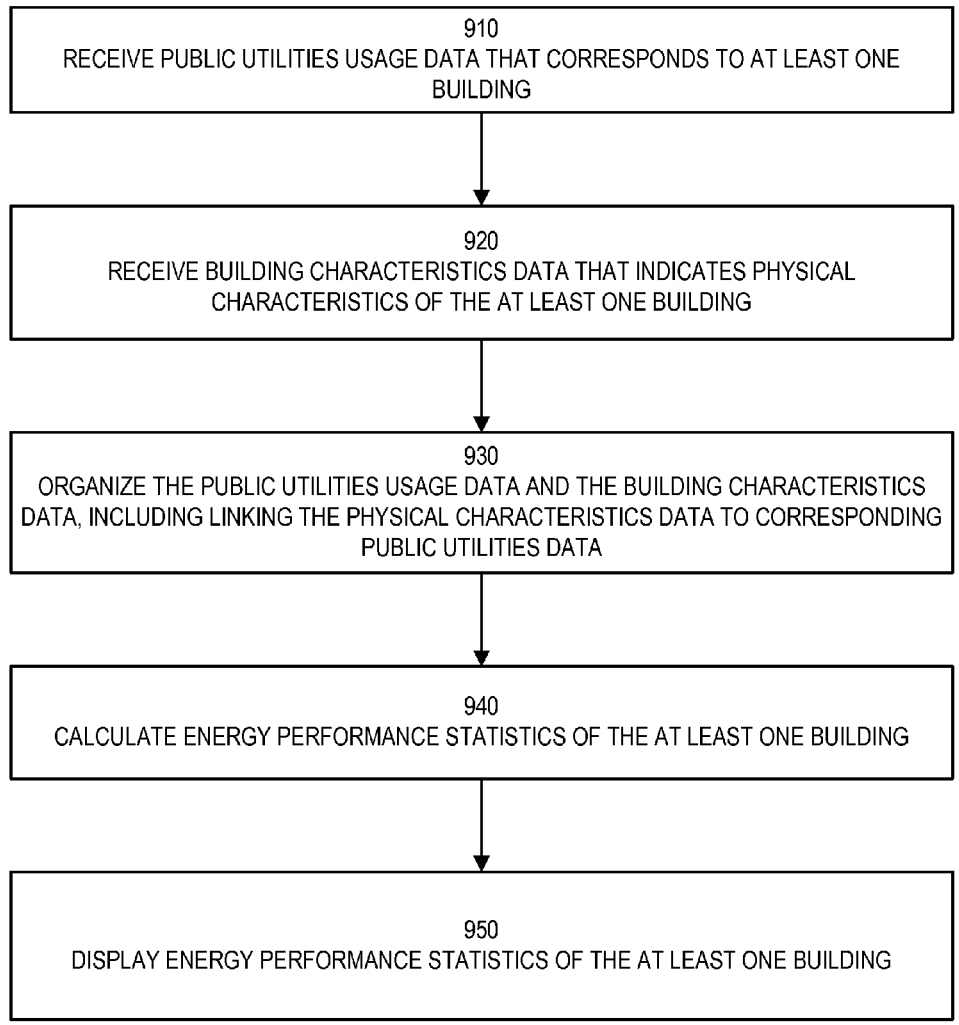
FIG. 9 is a flowchart illustrating an example of a process supporting a utilities manager according to embodiments herein.

Now describing embodiments more specifically, FIG. 9 is a flow chart illustrating embodiments disclosed herein.

In step 910 the utilities manager receives public utilities usage data that corresponds to at least one building. This data can be received manually, from a spreadsheet, or from a third-party utility company website, or other sources with utility data.

In step 920, the utilities manager receives building characteristics data that indicates physical characteristics of the at least one building. For example, the utilities manager can access real property databases, town records, assessors records, real estate databases, or receive manually submitted building characteristics data such as type of dwelling, building construction, heating system, and so forth.

In step 930, the utilities manager organizes the public utilities usage data and the building characteristics data, including linking the physical characteristics data to corresponding public utilities data. For example a database system can relate public utilities data with buildings and associated physical characteristics.

In step 940, the utilities manager calculates utilities/energy performance statistics of the at least one building. Such calculations can include cost of heating, electrical cost, end use, and so forth.

In step 950, the utilities manager displays utilities/energy performance statistics of the at least one building, such as via a graphical user interface and/or website system.

Figure 10:
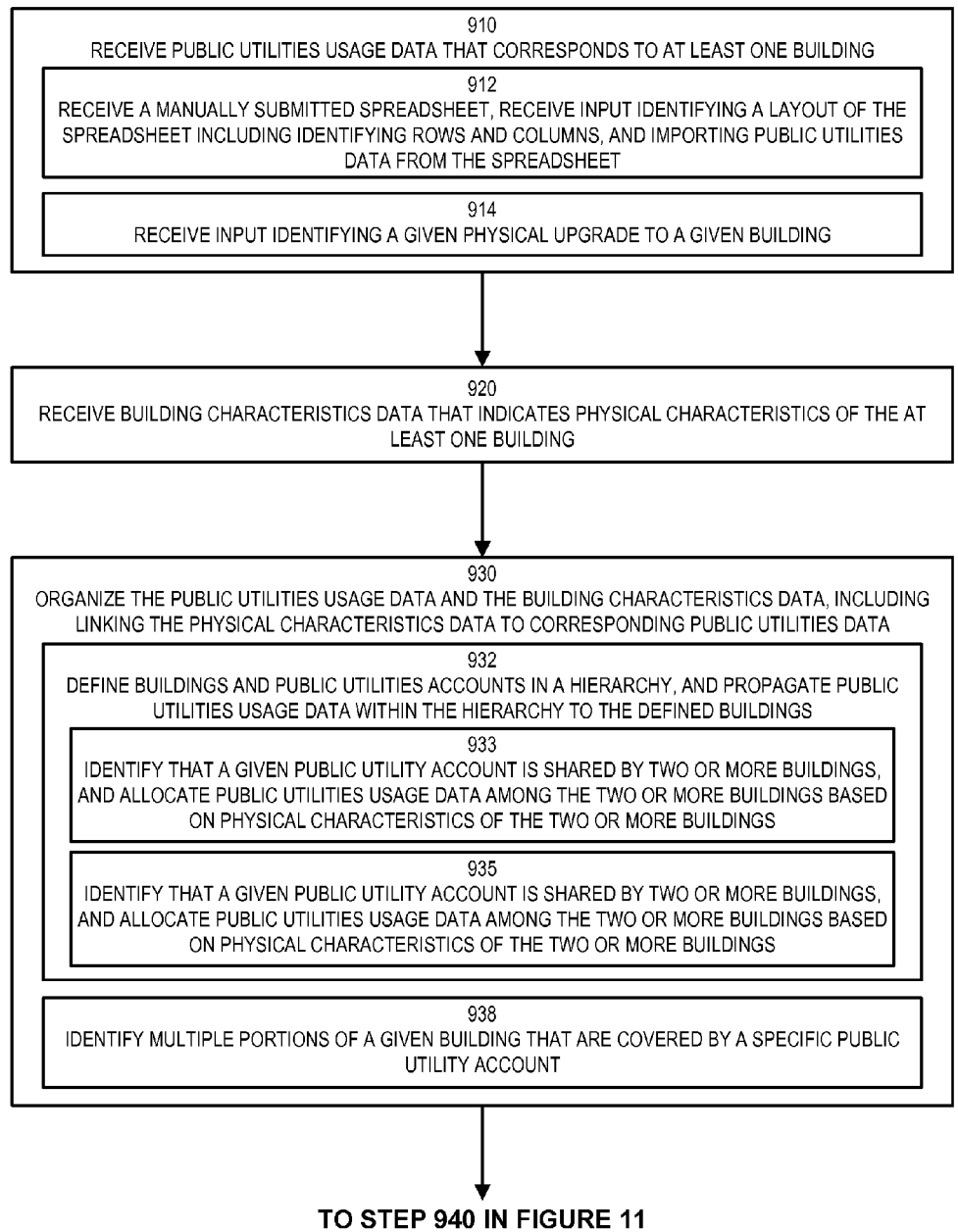
FIGS. 10-11 are a flowchart illustrating an example of a process supporting a utilities manager according to embodiments herein.
Figure 11:
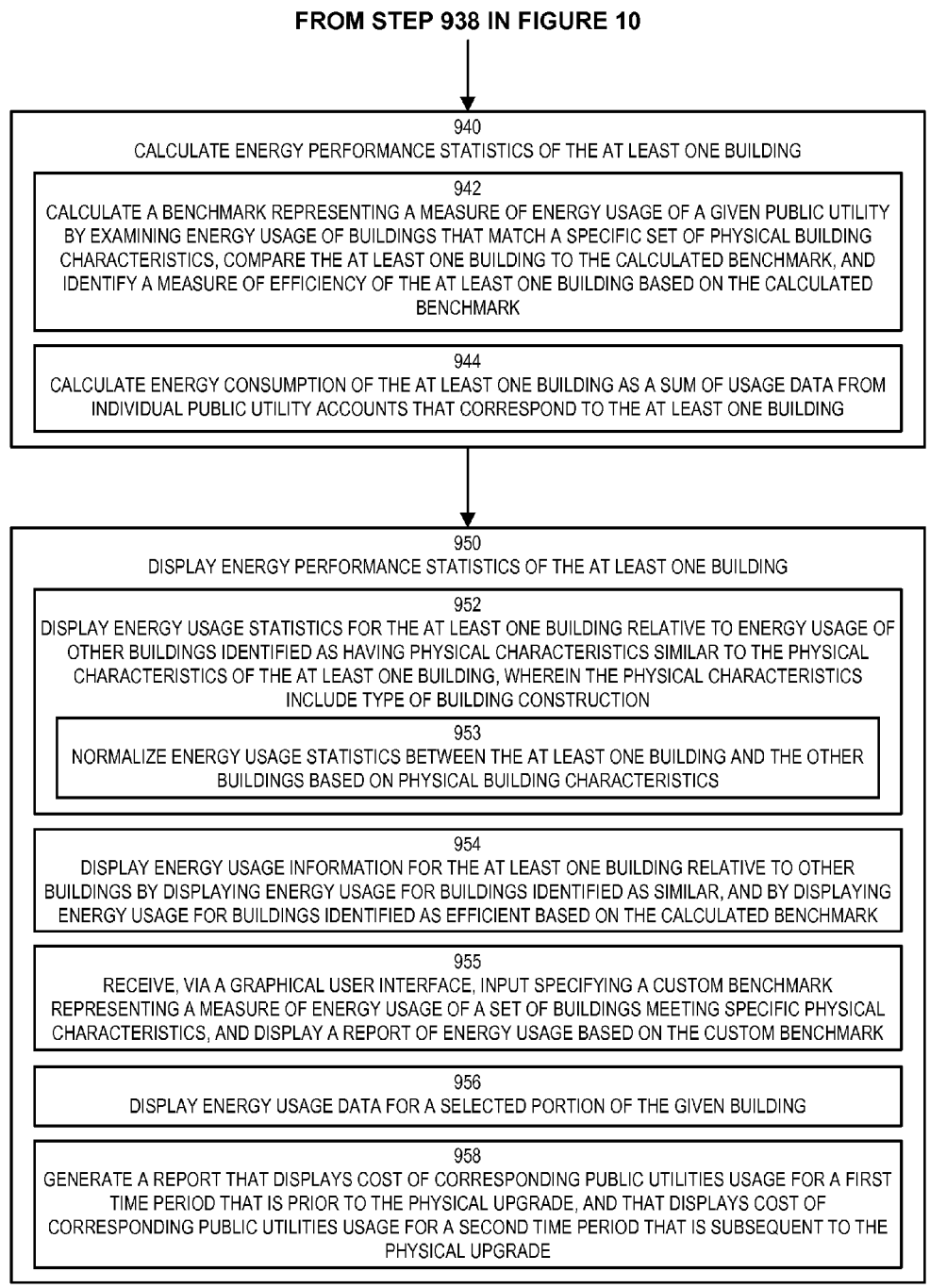

FIGS. 10-11 include a flow chart illustrating additional and/or alternative embodiments and optional functionality of the utilities manger 140 as disclosed herein.

In step 910, the utilities manager receives public utilities usage data that corresponds to at least one building.

In step 912, the utilities manager receives a manually-submitted spreadsheet including receiving input identifying a layout of the spreadsheet, which can include identifying rows and columns, and imports public utilities data from the spreadsheet. In other words, the utilities manager extracts and parses data according a manually indicated layout.

In step 914, the utilities manager receives input identifying a given physical upgrade to a given building. For example, the upgrade identifies a boiler upgrade or additional insulation.

In step 920, the utilities manager receives building characteristics data that indicates physical characteristics of the at least one building.

In step 930, the utilities manager organizes the public utilities usage data and the building characteristics data, including linking the physical characteristics data to corresponding public utilities data.

In step 932, the utilities manager defines buildings and public utilities accounts in a hierarchy, and propagates public utilities usage data within the hierarchy to the defined buildings. For example, by specifying an organization of buildings, developments, apartments and corresponding utility accounts, the utilities manager can appropriately distribute data. Note that public utilities usage data includes account data associated with the public utility, such as cost data, and payment data (how much paid versus actual billed amount).

In step 933, the utilities manager identifies that a given public utility account is shared by two or more buildings, and allocates public utilities usage data among the two or more buildings based on physical characteristics of the two or more buildings. For example, such allocation can be based on square footage.

In step 935, the utilities manager identifies that a given public utility account is shared by two or more buildings, and allocates public utilities usage data among the two or more buildings based on physical characteristics of the two or more buildings.

In step 938, the utilities manager identifies multiple portions of a given building that are covered by a specific public utility account. For example, a given building can have common areas as well as individual apartments.

In step 940, the utilities manager calculates utilities performance statistics of the at least one building.

In step 942, the utilities manager calculates a benchmark representing a measure of utilities usage of a given public utility by examining utilities usage of buildings that match a specific set of physical building characteristics, comparing the at least one building to the calculated benchmark, and identifying a measure of efficiency of the at least one building based on the calculated benchmark. Accordingly, the utilities manager can identify, for example, whether a given building is better or worse then similar buildings.

In step 944, the utilities manager calculates utilities consumption of the at least one building as a sum of usage data from individual public utility accounts that correspond to the at least one building. Some buildings have individual utilities meters for apartments. In such situations, the utilities manager can sum those accounts for an overall utilities measurement.

In step 950, the utilities manager displays utilities performance statistics of the at least one building.

In step 952, the utilities manager displays utilities usage statistics for the at least one building relative to utilities usage of other buildings identified as having physical characteristics similar to the physical characteristics of the at least one building. These physical characteristics can include type of building construction, size of building, or geographic location, among other things. Such a display enables quick evaluation for use with potential building improvements.

In step 953, the utilities manager normalizes utilities usage statistics between the at least one building and the other buildings based on physical building characteristics. Normalizing provides accurate relative comparisons where a raw data comparison would not be helpful for determining utilities performance.

In step 954, the utilities manager displays utilities usage information for the at least one building relative to other buildings by displaying utilities usage for buildings identified as similar, and by displaying utilities usage for buildings identified as efficient based on the calculated benchmark. By way of a non-limiting example, FIG. 2 displays an example of such a comparative display.

In step 955, the utilities manager receives, via a graphical user interface, input specifying a custom benchmark representing a measure of utilities usage of a set of buildings meeting specific physical characteristics, and displays a report of utilities usage based on the custom benchmark.

In step 956, the utilities manager displays utilities usage data for a selected portion of the given building. For example, displaying utilities usage for a selected floor or for common areas.

In step 958, the utilities manager generates a report that displays cost of corresponding public utilities usage for a first time period that is prior to the physical upgrade, and that displays cost and/or usage of corresponding public utilities usage for a second time period that is subsequent to the physical upgrade. In other words, the utilities manager can display before and after data respective to a particular upgrade to evaluate effectiveness of the upgrade. Such a display can include identifying a difference between projected and actual savings.

In other embodiments, can include receiving input specifying a custom year-over-year report for a given building, and then displaying the custom year-over-year report as a graph comparing public utilities cost for the given building over consecutive years.

In another embodiment, the utilities manager receives, via a graphical user interface of a first user account, input specifying a second user account to be permitted access to the first user account. The utilities manager then receives, via the graphical user interface of the first user account, a manually input security question. The utilities manager displays, via a graphical user interface of the second user account, the security question, and receives, via the graphical user interface of the second user account, manual input representing a response to the security question. The utilities manager displays, via the graphical user interface of the first user account, the response to the security question, and receives, via the graphical user interface of the first user account, input indicating acceptance of the response to the security question. Subsequently, the utilities manager grants to the second user account, access to the first user account.

Continuing with FIG. 12, the following discussion provides a basic embodiment indicating how to carry out functionality associated with the utilities manger 140 as discussed above. It should be noted, however, that the actual configuration for carrying out the utilities manger 140 can vary depending on a respective application. For example, computer system 149 can include one or multiple computers that carry out the processing as described herein.

In different embodiments, computer system 149 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the utilities manger 140 of computer system 149 to communicate over a network and, if necessary, retrieve any data required to create views, process content, communicate with a user, etc. according to embodiments herein.

As shown, memory system 141 is encoded with utilities manger application 140-1 that supports functionality as discussed above and as discussed further below. Utilities manager application 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the utilities manger application 140-1. Execution of the utilities manger application 140-1 produces processing functionality in utilities manger process 140-2. In other words, the utilities manger process 140-2 represents one or more portions of the utilities manger 140 performing within or upon the processor 142 in the computer system 149.

It should be noted that, in addition to the utilities manger process 140-2 that carries out method operations as discussed herein, other embodiments herein include the utilities manger 140-1 itself (i.e., the un-executed or non-performing logic instructions and/or data). The utilities manger 140-1 may be stored on a non-transitory, tangible computer-readable storage medium including computer readable storage media such as floppy disk, hard disk, optical medium, etc. According to other embodiments, the utilities manger 140-1 can also be stored in a memory type system such as in firmware, read only memory (ROM), or, as in this example, as executable code within the memory system 1012.

In addition to these embodiments, it should also be noted that other embodiments herein include the execution of the utilities manger application 140-1 in processor 140-2 as the utilities manger process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer program product including a non-transitory computer-storage medium having instructions stored thereon for processing data information, such that the instructions, when carried out by a processing device, cause the processing device to perform the operations of:
   receiving public utilities usage data that corresponds to at least one building;
   receiving building characteristics data that indicate physical characteristics of the at least one building;
   organizing the public utilities usage data and the building characteristics data, including linking the physical characteristics data to corresponding public utilities data;
   calculating utilities performance statistics of the at least one building from the physical characteristics data and corresponding public utilities data;
   outputting utilities performance statistics of the at least one building; and
   receiving, via a graphical user interface of a first user account, input specifying a second user account to be permitted access to the first user account;
   receiving, via the graphical user interface of the first user account, a manually input security question;
   displaying, via a graphical user interface of the second user account, the security question;
   receiving, via the graphical user interface of the second user account, manual input representing a response to the security question;
   displaying, via the graphical user interface of the first user account, the response to the security question;
   receiving, via the graphical user interface of the first user account, input indicating acceptance of the response to the security question; and
   granting to the second user account, access to the first user account.

2. The computer program product of claim 1, wherein organizing the public utilities usage data and the building characteristics data includes defining buildings and public utilities accounts in a hierarchy, and propagating public utilities usage data within the hierarchy to the defined buildings.

3. The computer program product of claim 2, wherein organizing the public utilities usage data and the building characteristics data includes:
   identifying that a given public utility account is shared by two or more buildings; and
   allocating public utilities usage data among the two or more buildings based on physical characteristics of the two or more buildings.

4. The computer program product of claim 2, wherein organizing the public utilities usage data and the building characteristics data includes:
   identifying multiple portions of a given building that are covered by a specific public utility account; and
   wherein outputting utilities performance statistics of the at least one building includes outputting utilities usage data for a selected portion of the given building.

5. The computer program product of claim 1, wherein calculating utilities performance statistics of the at least one building includes calculating a benchmark representing a measure of utilities usage of a given public utility by examining utilities usage of buildings that match a specific set of physical building characteristics.

6. The computer program product of claim 5, wherein calculating utilities performance statistics of the at least one building includes:
   comparing the at least one building to the calculated benchmark; and
   identifying a measure of efficiency of the at least one building based on the calculated benchmark.

7. The computer program product of claim 6, wherein outputting utilities performance statistics includes displaying utilities usage information for the at least one building relative to other buildings by outputting utilities usage for buildings identified as similar, and by outputting utilities usage for buildings identified as efficient based on the calculated benchmark.

8. The computer program product of claim 1, wherein displaying utilities performance statistics of the at least one building includes displaying utilities usage statistics for the at least one building relative to utilities usage of other buildings identified as having physical characteristics similar to the physical characteristics of the at least one building, wherein the physical characteristics are selected from the group consisting of type of building construction, size of building, geographic location, age of building, heating fuel, heating system, and cooling system.

9. The computer program product of claim 8, wherein outputting utilities usage statistics, for the at least one building relative to utilities usage of other buildings identified as having physical characteristics similar to the physical characteristics of the at least one building, includes normalizing utilities usage statistics between the at least one building and the other buildings based on physical building characteristics.

10. The computer program product of claim 1, wherein calculating utilities performance statistics of the at least one building includes calculating utilities consumption of the at least one building as a sum of usage data from individual public utility accounts that correspond to the at least one building.

11. The computer program product of claim 1, wherein receiving public utilities data includes:
   receiving a manually submitted spreadsheet;
   receiving input identifying a layout of the spreadsheet including identifying rows and columns; and
   importing public utilities data from the spreadsheet.

12. The computer program product of claim 1, wherein outputting utilities performance statistics of the at least one building includes:
   receiving, via a graphical user interface, input specifying a custom benchmark representing a measure of utilities usage of a set of buildings meeting specific physical characteristics; and
   outputting a report of utilities usage based on the custom benchmark.

13. The computer program product of claim 1, wherein receiving building characteristics data that indicates physical characteristics of the at least one building includes receiving input identifying a given physical upgrade to a given building; and
   wherein outputting utilities performance statistics of the at least one building includes generating a report that displays cost of corresponding public utilities usage for a first time period that is prior to the physical upgrade, and that displays cost of corresponding public utilities usage for a second time period that is subsequent to the physical upgrade.

14. The computer program product of claim 1, wherein outputting utilities performance statistics of the at least one building includes:
   receiving, via a graphical user interface, input specifying a custom year-over-year report for a given building; and
   outputting the custom year-over-year report as a graph comparing public utilities cost for the given building over consecutive years.

15. A system for tracking utilities usage, the system comprising:
   a processor; and
   a memory coupled to the processor, the memory storing instructions that, when executed by the processor, cause the system to perform the operations of:
      receiving public utilities usage data that corresponds to at least one building;
      receiving building characteristics data that indicate physical characteristics of the at least one building;
      organizing the public utilities usage data and the building characteristics data, including linking the physical characteristics data to corresponding public utilities data;
      calculating utilities performance statistics of the at least one building from the physical characteristics data and corresponding public utilities data;
      outputting utilities performance statistics of the at least one building;
      receiving, via a graphical user interface of a first user account, input specifying a second user account to be permitted access to the first user account;
      receiving, via the graphical user interface of the first user account, a manually input security question;
      displaying, via a graphical user interface of the second user account, the security question;
      receiving, via the graphical user interface of the second user account, manual input representing a response to the security question;
      displaying, via the graphical user interface of the first user account, the response to the security question;
      receiving, via the graphical user interface of the first user account, input indicating acceptance of the response to the security question; and
      granting to the second user account, access to the first user account.

16. The system of claim 15, wherein organizing the public utilities usage data and the building characteristics data includes defining buildings and public utilities accounts in a hierarchy, and propagating public utilities usage data within the hierarchy to the defined buildings.

17. The system of claim 15, wherein displaying utilities performance statistics of the at least one building includes outputting utilities usage statistics for the at least one building relative to utilities usage of other buildings identified as having physical characteristics similar to the physical characteristics of the at least one building and normalizing utilities usage statistics between the at least one building and the other buildings based on physical building characteristics, wherein the physical characteristics include type of building construction.

18. The system of claim 15, wherein calculating utilities performance statistics of the at least one building includes calculating a benchmark representing a measure of utilities usage of a given public utility by examining utilities usage of buildings that match a specific set of physical building characteristics, and wherein outputting utilities performance statistics includes outputting utilities usage information for the at least one building relative to other buildings by outputting utilities usage for buildings identified as similar, and by outputting utilities usage for buildings identified as efficient based on the calculated benchmark.

19. A computer-implemented method for tracking utilities usage, the computer-implemented method comprising:
   a processor configured with a set of instructions for:
      receiving public utilities usage data that corresponds to at least one building;
      receiving building characteristics data that indicate physical characteristics of the at least one building;
      organizing the public utilities usage data and the building characteristics data, including linking the physical characteristics data to corresponding public utilities data;
      calculating utilities performance statistics of the at least one building from the physical characteristics data and corresponding public utilities data;
      outputting utilities performance statistics of the at least one building;
      receiving, via a graphical user interface of a first user account, input specifying a second user account to be permitted access to the first user account;
      receiving, via the graphical user interface of the first user account, a manually input security question;
      displaying, via a graphical user interface of the second user account, the security question;
      receiving, via the graphical user interface of the second user account, manual input representing a response to the security question;
      displaying, via the graphical user interface of the first user account, the response to the security question;

receiving, via the graphical user interface of the first user account, input indicating acceptance of the response to the security question; and granting to the second user account, access to the first user account.

* * * * *